(12) United States Patent
McAlpine et al.

(10) Patent No.: US 11,543,828 B2
(45) Date of Patent: Jan. 3, 2023

(54) SYSTEMS AND METHODS FOR IDENTIFYING MACHINE TRAVEL PATHS

(71) Applicant: Caterpillar Paving Products Inc., Brooklyn Park, MN (US)

(72) Inventors: Jacob J. McAlpine, Otsego, MN (US); John L. Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 143 days.

(21) Appl. No.: 16/835,527

(22) Filed: Mar. 31, 2020

(65) Prior Publication Data

US 2021/0302979 A1 Sep. 30, 2021

(51) Int. Cl.
*G05D 1/02* (2020.01)
*G01C 21/34* (2006.01)

(52) U.S. Cl.
CPC ....... *G05D 1/0217* (2013.01); *G01C 21/3492* (2013.01); *G05D 2201/0202* (2013.01)

(58) Field of Classification Search
CPC ......... G05D 1/0217; G05D 2201/0202; G01C 21/3492
See application file for complete search history.

(56) References Cited

U.S. PATENT DOCUMENTS

| | | | |
|---|---|---|---|
| 6,917,921 B1* | 7/2005 | Cimral | G06Q 40/06 715/713 |
| 9,347,780 B2* | 5/2016 | Caine | G01C 21/34 |
| 9,778,054 B2 | 10/2017 | Rovik et al. | |
| 9,953,530 B2 | 4/2018 | Lloreda et al. | |
| 10,168,165 B2 | 1/2019 | Lewis et al. | |
| 10,330,481 B2 | 6/2019 | Lewis et al. | |
| 2002/0171650 A1* | 11/2002 | Prabhakaran | G08G 1/202 345/530 |
| 2003/0146854 A1* | 8/2003 | Jones | G06Q 10/08 340/988 |
| 2005/0171692 A1* | 8/2005 | Hamblen | G07C 5/085 701/468 |
| 2010/0205022 A1* | 8/2010 | Brown | G01C 21/20 705/7.11 |

(Continued)

OTHER PUBLICATIONS

Polo, Optimization Strategies for Fleet Management, 2016, IEEE.*

*Primary Examiner* — Arthur Duran
(74) *Attorney, Agent, or Firm* — Lee & Hayes, PLLC

(57) ABSTRACT

A method includes receiving project information indicating a location of a worksite. The method also includes providing a first travel path to an electronic device associated with a mobile machine, wherein providing the first travel path to the electronic device causes at least part of the first travel path to be displayed via a display. The method further includes receiving location information indicating an initial location of the machine and one or more additional locations of the machine. Additionally, the method includes determining that the machine reached the worksite, and identifying, based at least in part on the location information, a second travel path extending from the initial location to the worksite. The method further includes determining whether the second travel path matches the first travel path, and storing at least one of the travel paths in a memory associated with a controller.

19 Claims, 5 Drawing Sheets

(56) References Cited

U.S. PATENT DOCUMENTS

| | | | | |
|---|---|---|---|---|
| 2010/0257015 | A1* | 10/2010 | Molander | G06Q 10/06 |
| | | | | 707/E17.014 |
| 2013/0226408 | A1* | 8/2013 | Fung | B60K 28/06 |
| | | | | 701/1 |
| 2013/0290062 | A1* | 10/2013 | Patel | G06Q 10/06313 |
| | | | | 705/7.23 |
| 2015/0112647 | A1* | 4/2015 | Currin | H04L 67/10 |
| | | | | 703/1 |
| 2015/0161827 | A1* | 6/2015 | Getchius | G06Q 10/06398 |
| | | | | 701/519 |
| 2016/0371553 | A1* | 12/2016 | Farnham, IV | G08G 1/04 |
| 2017/0023377 | A1* | 1/2017 | Burtner | G08B 13/2462 |
| 2018/0003516 | A1* | 1/2018 | Khasis | G08G 1/207 |
| 2018/0046981 | A1* | 2/2018 | Honig | G06Q 10/0833 |
| 2018/0111538 | A1* | 4/2018 | Detter | B60P 1/42 |
| 2018/0112990 | A1* | 4/2018 | Fowe | G01C 21/3676 |
| 2018/0162412 | A1* | 6/2018 | Gao | B60W 30/143 |
| 2018/0255428 | A1* | 9/2018 | Bagchi | H04L 67/535 |
| 2019/0080287 | A1* | 3/2019 | Kotake | B65G 61/00 |
| 2019/0162551 | A1* | 5/2019 | Kean | G06V 20/13 |
| 2020/0034765 | A1* | 1/2020 | Gupta | G06F 16/29 |
| 2020/0225670 | A1* | 7/2020 | Jankovic | G05D 1/0214 |
| 2020/0372426 | A1* | 11/2020 | Keaton | H04W 4/024 |

* cited by examiner

SYSTEMS AND METHODS FOR IDENTIFYING MACHINE TRAVEL PATHS

TECHNICAL FIELD

The present disclosure relates to systems and methods associated with identifying a travel path of a mobile machine. More specifically, the present disclosure relates to systems and methods associated with identifying a travel path of a haul truck traveling between a paving material plant and a worksite.

BACKGROUND

Machines, such as haul trucks, are often used to perform a variety of tasks associated with a worksite or project. For instance, in an example paving project, one or more haul trucks are typically used to transport paving material from a paving material plant to a worksite where the paving material will be distributed along a work surface of the worksite by one or more paving machines. One or more compaction machines following behind the paving machine can be used to compact the freshly-laid paving material to a desired density or stiffness. The operation of these machines is coordinated in order to perform paving operations in an efficient manner. For example, the quality of a mat of paving material deposited by the paving machine is improved when the paving machine is controlled to operate without periodic stoppages caused by an inadequate supply of paving material being delivered to the worksite by the one or more haul trucks described above. The quality of the mat is also improved when the paving material delivered to the worksite by the one or more haul trucks is maintained within a desired temperature range. However, in some situations, it is difficult to manage the delivery of paving material to the worksite. For instance, the various haul trucks delivering paving material often traverse different respective travel paths between the paving material plant and the worksite, which can lead to delays and inconsistencies in the delivery of paving material.

An example system for coordinating the activities of paving machines is described in U.S. Patent Application Publication No. 2013/0290062 (hereinafter referred to as the '062 reference). In particular, the '062 reference describes a system for implementing a computer-based method of coordinating activities associated with paving a roadway. The '062 reference describes, for example, a server configured to facilitate communication between system components. As explained in the '062 reference, the server receives a communication from a transport truck indicating that a batch of paving material has been delivered to the roadway, and such a communication is generated automatically by a truck computer system in conjunction with a global positioning system (GPS) receiver on the truck.

The '062 reference does not, however, describe determining or otherwise identifying an optimized haul truck travel path extending from the paving material plant to the worksite. For instance, the '062 reference does not describe identifying such a travel path based on a determination that the identified travel path results in a reduction in travel time for the haul truck. Nor does the '062 reference describe identifying such a travel path based on a determination that a number of additional haul trucks previously traveled the identified travel path. As a result, the paving machines described in the '062 reference will be caused to stop periodically due to delayed or inconsistent delivery of paving material to the worksite. Such stoppages hinder the efficiency of the paving system, and reduce the consistency and quality of the paving material mat. Additionally, the temperature of paving material delivered to the paving machines described in the '062 reference may fall outside of a desired temperature range, further reducing the quality of the paving material mat.

Examples of the present disclosure are directed toward overcoming the deficiencies noted above.

SUMMARY

In an example of the present disclosure, a method includes receiving, with a controller, project information indicating a unique project identifier and a location of a worksite. The method also includes providing, with the controller, a first travel path to an electronic device associated with a mobile machine, the machine being associated with the project identifier, wherein providing the first travel path to the electronic device causes at least part of the first travel path to be displayed via a display in communication with the electronic device. The method further includes receiving, with the controller, location information indicating an initial location of the machine and one or more additional locations of the machine. Additionally, the method includes determining, with the controller and based at least in part on the location information, that the machine reached the worksite. The method also includes identifying, with the controller and based at least in part on the location information, a second travel path extending from the initial location to the worksite. The method further includes determining, with the controller, whether the second travel path matches the first travel path, and storing the first travel path or the second travel path in a memory associated with the controller.

In another example of the present disclosure, a system includes a haul truck configured to haul material from a paving material plant to a worksite, and a controller including one or more processors, the controller being in communication with an electronic device associated with a haul truck via a network. The controller is configured to receive project information indicating a location of the paving material plant and a location of the worksite. The controller is also configured to provide a first travel path to the electronic device and via the network, the first travel path extending from the paving material plant to the worksite, wherein providing the first travel path to the electronic device causes at least part of the first travel path to be displayed via a display in communication with the electronic device. Additionally, the controller is configured to receive location information, the location information indicating one or more locations of the haul truck as the haul truck travels from the paving material plant to the worksite. The controller is further configured to identify, based at least in part on the location information, a second travel path extending from the paving material plant to the worksite. The controller is also configured to determine whether the second travel path matches the first travel path, and store the first travel path or the second travel path in a memory associated with the controller.

In a further example of the present disclosure, a system includes a controller including one or more processors, and non-transitory computer-readable media storing instructions that, when executed by the one or more processors, cause the one or more processors to perform operations. In such an example, the operations include providing, via a network, a first travel path to an electronic device associated with a haul truck, the first travel path extending from a paving material plant to a worksite, wherein providing the first travel path to the electronic device causes at least part of the first travel path to be displayed via a display in communication with the electronic device. The operations further include receiving location information generated using a location sensor carried by the haul truck, the location information indicating one or more locations of the haul truck as the haul truck travels between the paving material plant and the worksite. The operations also include identifying, based at least in part on the one or more locations of the haul truck, a second travel path extending from the paving material plant to the worksite. Additionally, the operations include determining whether respective distances between locations along the second travel path and corresponding locations along the first travel path are less than a threshold distance, and storing the first travel path or the second travel path in the computer-readable media.

DETAILED DESCRIPTION

Figure 1:
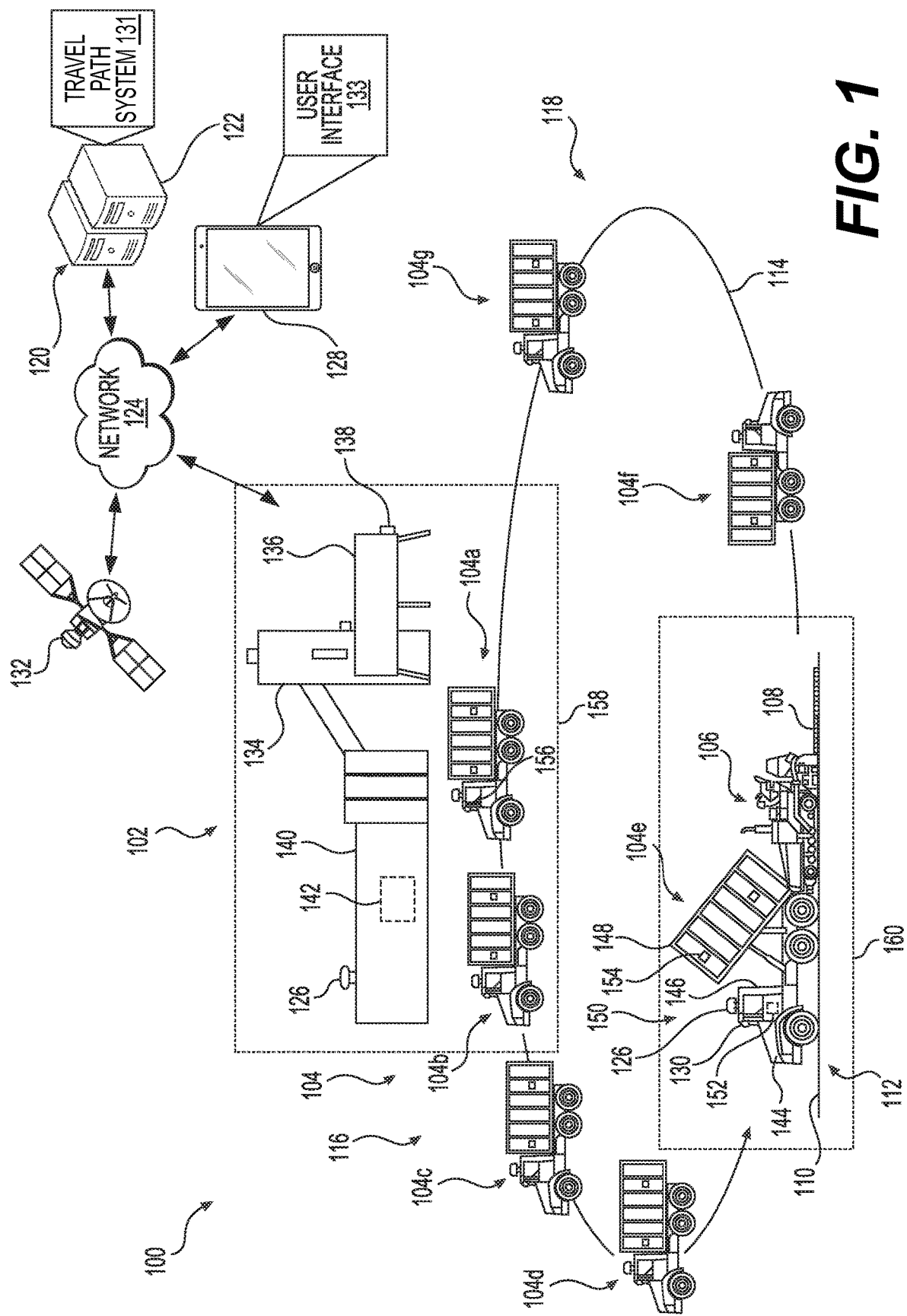
FIG. 1 is a schematic illustration of an example system of the present disclosure.

Wherever possible, the same reference numbers will be used throughout the drawings to refer to the same or like parts. Referring to FIG. 1, and as will be described in greater detail below, an example paving system 100 of the present disclosure includes a control system having one or more processors and other components configured to receive location information indicating locations of one or more mobile machines traveling between a paving material plant and a worksite. The control system is configured to identify a travel path (e.g., a preferred travel path) extending from the paving material plant to the worksite based on such information, and the identified travel path can be used for future deliveries of paving material. As shown in FIG. 1, an example paving system 100 includes one or more paving material plants 102. Additionally or alternatively, an example paving system 100 includes one or more machines such as one or more haul trucks 104, one or more paving machines 106, one or more compaction machines (not shown) and/or one or more additional mobile machines.

For example, the paving material plant 102 includes various equipment configured to heat, produce, sense, store, and/or transfer paving material 108 such as asphalt (or other material). For instance, one or more haul trucks 104 are loaded with a desired amount of paving material 108 at the paving material plant 102, and the haul trucks 104 deliver the paving material 108 to the paving machine 106. The paving machine 106 deposits the paving material 108 onto a work surface 110 of a worksite 112. In any of the examples described herein, the one or more haul trucks 104 are configured to travel along at least one travel path 114 extending from the paving material plant 102 to the worksite 112. Such a travel path 114 includes one or more partially or completely formed roads, highways, bridges, service roads, or other surfaces passable by construction equipment, haul trucks 104, paving equipment, mining equipment, over-the-road vehicles, off-road vehicles, and/or other mobile machines. Such an example worksite 112 includes, for example, a construction site, a paving site, a mine site, a road work site, a parking lot, or any other type of job site. Once the one or more haul trucks 104 have delivered the paving material 108 to the worksite 112, the haul trucks 104 transfer the paving material 108 to a hopper or other component of the paving machine 106, and the paving machines 106 apply and/or otherwise deposit the paving material 108 on the work surface 110.

Example paving systems 100 of the present disclosure include any number of haul trucks 104 as needed to satisfy the demand for paving material 108 at the worksite 112. The number of haul trucks 104 is selected based on, among other things, the amount (e.g., tons per hour) of paving material 108 expected to be processed by the one or more paving machines 106 at the worksite 112 and various requirements for the temperature of paving material 108 being delivered to the paving machines 106. As shown in FIG. 1, an example paving system 100 includes a first haul truck 104a, a second haul truck 104b, a third haul truck 104c, a fourth haul truck 104d, a fifth haul truck 104e, a sixth haul truck 104f, a seventh haul truck 104g (collectively, referred to herein as "haul trucks 104"), and/or one or more additional haul trucks (not shown). Other example paving systems 100 of the present disclosure include greater than or less than the seven haul trucks 104 shown in FIG. 1. Further, as shown in FIG. 1, the haul trucks 104 typically travel sequentially (e.g., one after another), along the travel path 114, from the paving material plant 102 to the worksite 112, and typically travel sequentially along the same travel path 114 as they return to the paving material plant 102. For example, the haul trucks 104 deliver paving material 108 to the worksite 112 by sequentially traversing a first portion 116 of the travel path 114 extending from the paving material plant 102 to the worksite 112, and return to the paving material plant 102 by sequentially traversing a second portion 118 of the travel path 114 extending from the worksite 112 to the paving material plant 102 (or other location). In other examples, one or more of the haul trucks 104 travel along separate (e.g., different) respective travel paths 114 between the paving material plant 102 and the worksite 112. As will be described herein, the control system and other components of the paving system 100 are configured to identify a travel path that is optimized for such haul truck travel.

Although not illustrated in FIG. 1, it is understood that some example paving systems 100 of the present disclosure include one or more additional worksites and/or one or more additional paving material plants (not shown). In such examples, the haul trucks 104 described herein travel between different ones of the additional (e.g., multiple) worksites and/or paving material plants along travel paths that at least partially differ from the travel path 114. Further, in some cases, the haul trucks 104 perform tasks at locations other than the paving material plant 102 and the worksite 112, such as to refuel, perform maintenance operations, load and/or distribute other types of material, and the like.

In some examples, the paving material plant 102 produces paving material 108 such as asphalt from bitumen, aggregate, and other materials or fillers. The paving material 108 is often produced in batches with each batch sorted or held in a separate storage or holding location, such as a silo, until it is loaded into one or more haul trucks 104 at a loading station of the paving material plant 102. Each holding location is dedicated to storing or holding paving material 108 for a particular worksite 112 and paving material 108 within a particular holding location is periodically loaded into one or more haul trucks 104 for transport to a worksite 112. The characteristics of each batch stored within a holding location is set based upon the desired characteristics for a particular paving project. For example, the amount of oil and the size of the aggregate is set based upon the desired characteristics of the paving material 108 and the requirements of each paving project.

As noted above, the example paving system 100 shown in FIG. 1 includes a control system 120 and one or more system controllers 122. In some examples, the control system 120 and/or the system controller 122 are located at the paving material plant 102. In such examples, the control system 120 and/or the system controller 122 also includes components located remotely from the paving material plant 102, such as on any of the machines of the paving system 100, at the worksite 112, and/or at a remote command center (not shown). In some examples, the control system 120 and/or the system controller 122 are located remote from the paving material plant 102 and/or remote from the worksite 112, such as at the remote commend center referred to above. In any of the examples described herein, the functionality of the system controller 122 may be distributed so that certain operations are performed at the paving material plant 102 and other operations are performed remotely. For example, some operations of the system controller 122 are performed at the worksite 112, on one or more of the haul trucks 104, on one or more of the paving machines 106, etc. In some examples, the system controller 122 comprises a component of the paving system 100, the paving material plant 102, one or more of the haul trucks 104, one or more of the paving machines 106, a component of a separate electronic device (e.g., a mobile phone, a tablet, a laptop computer, etc.), and/or the control system 120. As described in more detail below, the control system 120 and/or components of the control system 120, such as the system controller 122, is configured to receive information indicating locations of a mobile machine, such as one or more of the haul trucks 104, and to determine, based at least in part on the received information, that the machine reached the worksite 112. The control system 120 and/or components of the control system 120, such as the system controller 122, is also configured to identify, based at least in part on the received information, a travel path 114 extending from an initial location of the machine (e.g., from the paving material plant 102) to the worksite 112. The control system 120 and/or components of the control system 120, such as the system controller 122, is further configured to store the travel path 114 in a memory associated with the control system 120 (e.g., in a memory associated with the system controller 122), and/or to generate a user interface including visual indicia of the travel path 114.

The system controller 122 is an electronic controller that operates in a logical fashion to perform operations, execute algorithms, store and retrieve data and/or other desired operations. The system controller 122 includes or accesses memory, secondary storage devices, processors, and any other components for running an application. In some examples, the memory and/or secondary storage devices (not shown) are in the form of read-only memory (ROM), random-access memory (RAM), or integrated circuitry that is accessible by the system controller 122. In some examples, various other circuits are also associated with the system controller 122 such as power supply circuitry, signal conditioning circuitry, driver circuitry, and/or other types of circuitry.

The system controller 122 comprises a single controller, or alternatively, the system controller 122 includes more than one controller (such as additional controllers associated with each of the haul trucks 104, paving machines 106, compaction machines (not shown), and/or other machines/components of the paving system 100) configured to control various functions and/or features of the paving system 100. As used herein, the term "controller" is meant in its broadest sense to include one or more controllers, processors, central processing units, and/or microprocessors that are associated with the paving system 100, and that are programmed to, operable to, and/or otherwise configured to cooperate in controlling various functions and operations of the paving material plant 102 and/or the machines of the paving system 100. The functionality of the system controller 122 is implemented in hardware and/or software without regard to functionality. For instance, in some examples the system controller 122 relies on one or more data maps, look-up tables, neural networks, algorithms, machine learning algorithms, data layers, predictive layers, and/or other components relating to the operating conditions and the operating environment of the paving system 100 that are stored in memory (not shown) operably connected to and/or otherwise associated with the system controller 122. In some examples, the data maps, look-up tables, and other components noted above include a collection of data in the form of tables, graphs, and/or equations to maximize the performance and efficiency of the paving system 100 and its operation.

The components of the control system 120 are in communication with and/or otherwise operably connected to any of the components of the paving system 100 via a network 124. In one or more of the examples described herein, the network 124 is a local area network ("LAN"), a larger network such as a wide area network ("WAN"), or a collection of networks, such as the Internet. Protocols for network communication, such as TCP/IP, are used to implement the network 124. Although examples are described herein as using a network 124 such as the Internet, other distribution techniques are often implemented that transmit information via memory cards, flash memory, or other portable memory devices.

It is also understood that the paving material plant 102, the various haul trucks 104, paving machines 106, electronic devices operable by one or more users, and/or other components of the paving system 100 include respective controllers, and each of the respective controllers are in communication and/or are otherwise be operably connected via the network 124. For example, the network 124 comprises a component of a wireless communication system of the paving system 100, and as part of such a wireless communication system, the paving material plant 102, the one or more haul trucks 104, the paving machine 106, the electronic devices operable by one or more users, and/or other components of the paving system 100 include respective communication devices 126. Such communication devices 126 are configured to permit wireless transmission of a plurality of signals, instructions, commands, and/or information between the paving material plant 102, the haul trucks 104, the paving machines 106, the compaction machines, and/or the system controller 122, as well as to permit communication with other machines and systems remote from the paving material plant 102, haul trucks 104, paving machines 106, and/or the worksite 112. For example, such communication devices 126 include a transmitter configured to transmit signals to a receiver of one or more other such communication devices 126. In such examples, each communication device 126 also includes a receiver configured to receive such signals. In some examples, the transmitter and the receiver of a particular communication device 126 are combined as a transceiver or other such component. In any of the examples described herein, such communication devices 126 also enable communication with one or more tablets, computers, cellular/wireless telephones, personal digital assistants, mobile devices, or other electronic devices 128 located at the worksite 112, at the paving material plant 102, and/or remote from the worksite 112 or the paving material plant 102. Such electronic devices 128 include, for example, desktop computers, laptop computers, mobile phones, and/or tablets of project managers (e.g., foremen) overseeing daily operations at the worksite 112, at the paving material plant 102, and/or in surrounding areas. Such electronic devices 128 also include, for example, desktop computers, laptop computers, mobile phones, and/or tablets of paving material plant employees, worksite employees, operators of the one or more haul trucks 104 and/or other personnel associated with a project being performed at the worksite 112. For example, an electronic device 128 is typically carried by an operator of a haul truck 104 or other mobile machine traversing the travel path 114 extending from the paving material plant 102 to the worksite 112. In such examples, the electronic device 128 is, thus, disposed within, transported by, carried by, and/or otherwise associated with the haul truck 104 or other mobile machine being operated by the operator. In such examples, the system controller 122 and/or other components of the control system 102 provides one or more travel paths to the electronic device 128 associated with the haul truck 104 or other mobile machine.

The system controller 122, network 124, communication devices 126, electronic devices 128, and/or other components of the paving system 100 described herein implement or utilize any desired communication system or protocol including any of a plurality of communications standards. The desired protocols will permit communication between the system controller 122, one or more of the communication devices 126, and/or any other desired machines or components of the paving system 100. Examples of wireless communications systems or protocols that are used by the paving system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications are transmitted and received directly between the control system 120 and a machine (e.g., a paving machine 106, one of the haul trucks 104, etc.) of the paving system 100 or between such machines. In other instances, the communications are automatically routed without the need for re-transmission by remote personnel.

In examples of the present disclosure, one or more machines of the paving system 100 (e.g., the one or more haul trucks 104, the paving machine 106, and/or other such mobile machines) include a location sensor 130 configured to determine a location and/or orientation of the respective machine. In such embodiments, the communication device 126 of the respective machine is configured to generate and/or transmit signals indicative of such determined locations and/or orientations to, for example, a travel path system 131 of the system controller 122, to one or more of the electronic devices 128, and/or to the other respective machines of the paving system 100. In some examples, the location sensors 130 of the respective machines include and/or comprise a component of global navigation satellite system (GNSS) or a global positioning system (GPS). Alternatively, universal total stations (UTS) is utilized to locate respective positions of the machines. In example embodiments, one or more of the location sensors 130 described herein comprise a GPS receiver, transmitter, transceiver, laser prisms, and/or other such device, and the location sensor 130 is in communication with one or more GPS satellites 132 and/or UTS to determine a respective location of the machine to which the location sensor 130 is connected, within which the location sensor is disposed, and/or with which the location sensor 130 is otherwise associated. The location sensor 130, in communication with one or more GPS satellites 132 and/or UTS, determines such locations continuously, substantially continuously, and/or at various time intervals (e.g., once per second, once every two seconds, once every five seconds, etc.). In some examples, one or more additional machines of the paving system 100 is also in communication with the one or more GPS satellites 132 and/or UTS, and such GPS satellites 132 and/or UTS are configured to also determine respective locations of such additional machines.

In any of the examples described herein, machine locations determined by the respective location sensors 130 are used by the travel path system 131 of the system controller 122 and/or other components of the paving system 100 to coordinate activities of the haul trucks 104, paving machine 106, and/or other components of the paving system 100. In some examples, the travel path system 131 and/or other components of the system controller 122 receives project information from foremen, haul truck operators, paving material plant personnel, and/or one or more users of the control system 120. Such project information can indicate and/or otherwise include a unique project identifier. In some examples, such a unique project identifier includes a name, an alphanumeric code, and/or other indicator uniquely identifying a project to which a particular haul truck 104 (e.g., the haul truck 104a) is assigned or with which the haul truck 104a is associated. The travel path system 131 and/or other components of the system controller 122 also provides a first travel path to the electronic device 128 associated with the haul truck 104a. In such examples, the system controller 122 obtains the first travel path from a third-party source such as an external travel path generation engine. Alternatively, the system controller 122 determines that one or more mobile machines associated with the project identifier (e.g., one or more haul trucks 104 of the paving system 100) traveled from the paving material plant 102 to the worksite 112 along a previous travel path 114, and in such examples, the first travel path provided by the system controller 122 comprises such a previous travel path 114. Providing the first travel path to the electronic device 128 causes at least part of the first travel path to be displayed via a display that is a component of, operably connected to, and/or that is otherwise in communication with the electronic device 128. For example, providing the first travel path includes providing one or more signals and/or executable instructions which, when executed by a processor and/or other controller of the electronic device 128 cause the electronic device 128 to provide a user interface 133 via a display of the electronic device 128. In such examples, the user interface 133 illustrates visual indicia of at least part of the travel path.

In any of the examples described herein, the travel path system 131 and/or other components of the system controller 122 receive location information from the location sensor 130 associated with the haul truck 104a and via the network 124. Such location information (e.g., GPS coordinates, UTS coordinates, etc.) indicates various locations of the machine, and can indicate, for example an initial location (e.g., a location at the paving material plant 102) of the haul truck 104a. In such examples, the travel path system 131 and/or other components of the system controller 122 determines that the machine reached the worksite 112 based at least in part on such location information. Additionally or alternatively, the travel path system 131 and/or other components of the system controller 122 calculates, generates, determines, and/or otherwise identifies a second travel path (e.g., a current travel path) based at least in part on such location information. In such examples, the second travel path extends from the initial location of the haul truck 104a (e.g., the paving material plant 102) to the worksite 112. The travel path system 131 and/or other components of the system controller 122 determines whether the second travel path (e.g., the current travel path) matches the first travel path by, for example, comparing corresponding points or locations along the two travel paths. In such examples, the travel path system 131 and/or other components of the system controller 122 determines whether to accept the second travel path for future use based on such a comparison. The travel path system 131 leverages this information to streamline and/or otherwise optimize transport of paving material 108, identify impedances in the transport of the paving material 108, and the like.

In examples of the present disclosure, one or more of the user interfaces 133 described herein include, among other things, information indicative of the state(s) and/or location (s) of the haul trucks 104 of the paving system 100. Example user interfaces 133 also include visual indicia indicative of and/or otherwise illustrating at least part of the travel path 114. In some examples, the system controller 122 provides information indicative of the identified travel path 114 to, for example, the electronic device 128, a controller of the paving machine 106, a controller of the haul truck 104a, and/or other components of the paving system 100, via the network 124, for display of the travel path 114 via a display that is in communication with such components. In further examples, the system controller 122 provides information indicative of the identified travel path 114 to a controller of the paving machine 106, a controller of the haul truck 104a, and/or other components of the paving system 100 such that operation of the various components of the paving system 100 can be modified and/or otherwise controlled based at least in part the locations of the haul trucks 104 and/or on the travel path 114 identified by the system controller 122. In examples in which the haul trucks 104 and/or other components of the paving system 100 are operating under autonomous or semi-autonomous control, the speed, steering, paving rate, and/or other functions of such components are controlled automatically or semi-automatically based at least in part on the travel path 114 identified by the system controller 122.

With continued reference to FIG. 1, the paving material plant 102 includes various material delivery components, mixers, heaters, and/or other equipment configured to assist in manufacturing paving material 108 for use in various paving operations. Such equipment includes, for example, one or more conveyors or other devices configured to transport paving material 108 to one or more paving material silos 134 or other holding locations for storage therein. The paving material plant 102 also includes one or more load stations 136 configured to transfer paving material 108 from the one or more paving material silos 134 to the one or more haul trucks 104. Similarly, the load station 136 includes one or more sensors 138 configured to determine the presence and/or location of one or more haul trucks 104 (e.g., the haul truck 104a shown in FIG. 1), a time at which the haul truck 104a arrived at the load station 136, a time at which the haul truck 104a departed the load station 136, an amount (e.g., a weight) of paving material 108 loaded into the haul truck 104a, and/or other information associated with the haul truck 104a. In some examples, the sensor 138 comprises a scale or other mass sensor configured to determine the weight of the haul truck 104a upon entering the load station 136, the weight of the haul truck 104a after paving material has been loaded into the haul truck 104a, and/or a change in weight of the haul truck 104a.

The paving material plant 102 also includes one or more scale houses, operator stations, or other stations 140 for use by paving material plant personnel. For example, as shown in phantom in FIG. 1, one or more such stations 140 includes a paving material plant controller 142 that is substantially similar to and/or the same as the system controller 122 described above. In some examples, the paving material plant controller 142 comprises a component of the control system 120. In any of the examples described herein, the paving material plant controller 142 and/or other components of the paving material plant 102 are configured to monitor, record, and/or communicate activities of the various haul trucks 104 entering and leaving the paving material plant 102. For example, the various sensors of the paving material plant 102 and/or the paving material plant controller 142 monitor, sense, determine, record, and/or transmit information indicative of a project associated with a particular haul truck 104a, a time at which the particular haul truck 104a enters the paving material plant 102, a time at which the haul truck 104a leaves the paving material plant 102, the amount of paving material 108 loaded into the particular departing haul truck 104a, the destination of the particular haul truck 104a (e.g., the location of the worksite 112) the operator of the haul truck 104a, and/or other information. Such information is used by, for example, the system controller 122 in any of the state determinations, location determinations, and/or other operations described herein.

In some examples, further information associated with a haul truck 104a is collected while the particular haul truck 104a is disposed at the paving material plant 102. For instance, each of the haul trucks 104 have a unique license plate number, a unique truck identification number, a radio frequency identification (RFID) tag, and/or other haul truck identifier that is unique to the respective haul truck 104a. In such examples, a haul truck identifier unique to the respective haul truck 104a is scanned, observed, and/or otherwise determined by the sensor 138 while the haul truck 104a is disposed at the load station 136. Additionally, and/or alternatively, the haul truck identifier unique to the respective haul truck 104a is scanned, observed, and/or otherwise determined by one or more sensors (not shown) associated with the station 140 when the haul truck 104a is disposed at the station 140. Additionally, and/or alternatively, paving material plant personnel scan, observe, and/or otherwise determine the haul truck identifier unique to the respective haul truck 104a using one or more hand-held scanners, sensors, or other devices when the haul truck 104a is disposed at the load station 136, the station 140, and/or at other locations within the paving material plant 102. In any such examples, the sensors, hand-held scanners, or other devices described above provide the determined haul truck identifier to the paving material plant controller 142, together with a time stamp indicating the time at which the haul truck identifier was determined, in one or more signals transmitted via the network 124.

As noted above, the haul trucks 104 of the paving system 100 are operable to transport paving material 108 between the paving material plant 102 and one or more of the paving machines 106 located at the worksite 112. Each of the haul trucks 104 include a chassis 144 that supports a prime mover, such as an engine, and a cab 146 in which an operator is positioned to provide input instructions to operate the haul trucks 104. The engine is operatively connected to and drives a ground engaging drive mechanism such as wheels. A material transport unit such as a dump body 148 is pivotally mounted on the chassis 144 and receives a payload (e.g., paving material 108) to be hauled from one location to another.

Each of the haul trucks 104 includes a truck control system 150 and a truck controller 152 generally similar or identical to the control system 120 and the system controller 122, respectively. The truck control system 150 and the truck controller 152 are located on a respective one of the haul trucks 104 and may also include components located remotely from the respective one of the haul trucks 104 such as on any of the other machines of the paving system 100, at the paving material plant 102, or at a command center (not shown). In some examples, the functionality of truck controller 152 is distributed so that certain functions are performed on the respective one of the haul trucks 104 and other functions are performed remotely. In some examples, the truck control system 150 and/or the truck controller 152 enable autonomous and/or semi-autonomous control of the respective one of the haul trucks 104.

The haul trucks 104 are also equipped with a plurality of sensors connected to and/or otherwise in communication with the truck controller 152 and/or with the system controller 122. Such sensors are configured to provide data indicative (directly or indirectly) of various operating parameters of the respective one of the haul trucks 104, systems associated with the respective one of the haul trucks 104, and/or the worksite 112 and/or other environment in which the respective one of the haul trucks 104 is operating. In any of the examples described herein, such sensors comprise components of the truck control system 150, the control system 120, and/or the paving system 100, generally. For example, as noted above, each of the haul trucks 104 are equipped with a location sensor 130 configured to sense, detect, and/or otherwise determine a location and/or orientation of a respective one of the haul trucks 104. The location sensor 130 includes a plurality of individual sensors that cooperate to generate and provide location signals to the truck controller 152 and/or to the system controller 122 indicative of the location and/or orientation of a respective one of the haul trucks 104. In some examples, the location sensor 130 is fixed to the cab 146, the chassis 144, and/or any other component of one of the haul trucks 104. In other examples, however, the location sensor 130 is removably attached to a respective one of the haul trucks 104 and/or disposed within, for example, the cab 146 of a haul truck 104a during operation of the haul truck 104a. Regardless of the configuration, the location sensor 130 provides location information to the travel path system 131 and/or other components of the system controller 122 via the network 124, and such components are configured to calculate, generate, determine, and/or otherwise identify one or more travel paths 114 of the present disclosure based at least in part on such information.

With continued reference to FIG. 1, each of the haul trucks 104 also includes a load sensor 154 configured to sense, measure, and/or otherwise determine the load or amount of paving material 108 disposed within the dump body 148. In some examples, the haul trucks 104 include a display 156, such as an LCD display, which in such examples is communicatively coupled to the truck controller 152. In some examples, the display 156 is mounted on an interior and/or on an exterior of the haul trucks 104 for viewing by an operator. For instance, the display 156 is disposed within the cab 146 and is configured to display the user interface 133 described above. As will be described below, an example user interface 133 may include, among other things, visual indicia of the paving material plant 102, visual indicia of the worksite 112, visual indicia associated with one or more of the respective haul trucks 104, visual indicia of the travel path 114, and so forth. In some examples, the visual indicia associated with the one or more haul trucks 104 has characteristics that associate the various haul trucks 104 with different projects, locations of the haul trucks 104, tasks being completed by the haul trucks 104, materials being transported by the haul trucks 104, and the like.

Figure 2:
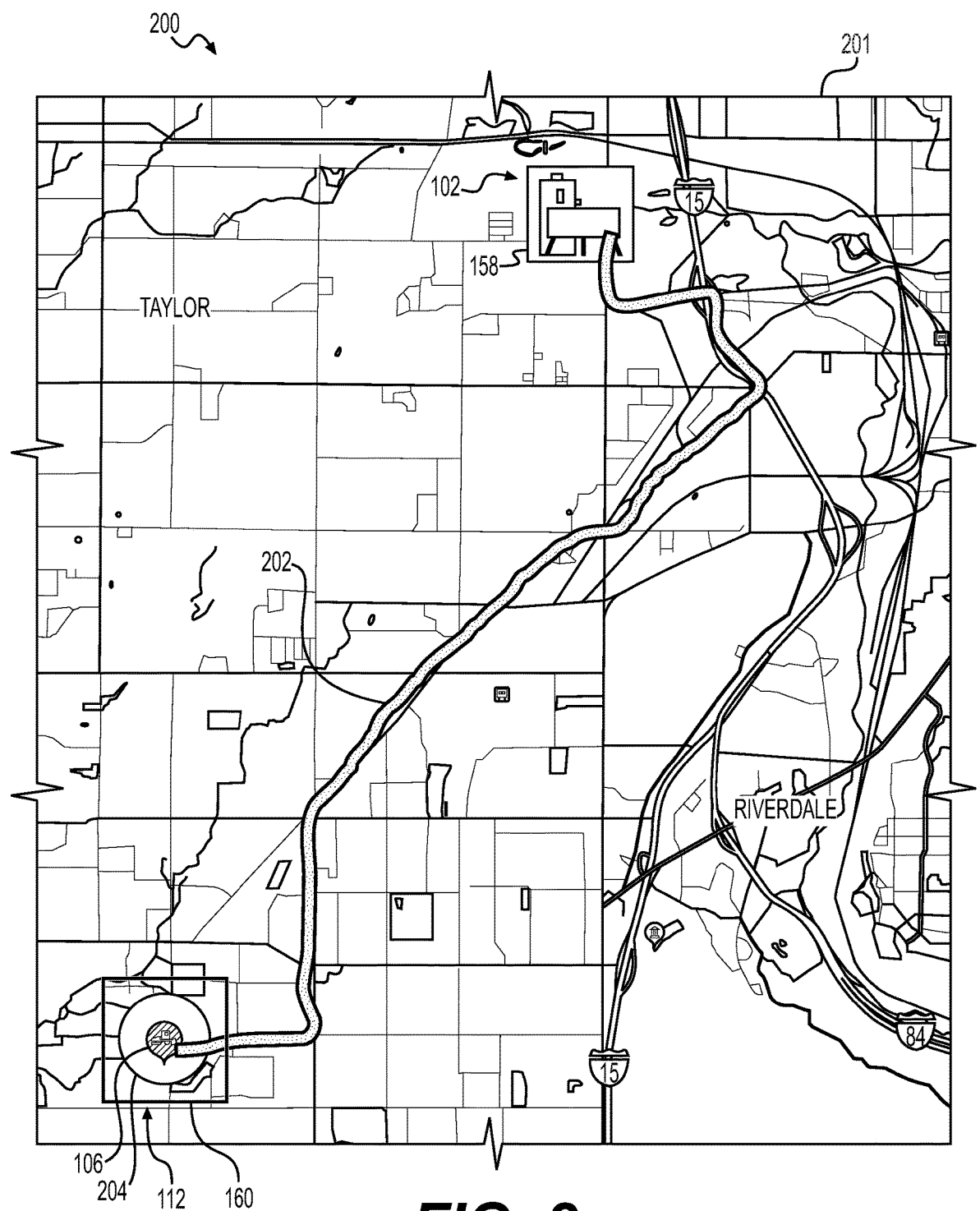
FIG. 2 shows a portion of an example user interface illustrating an example travel path of the present disclosure.
Figure 3:
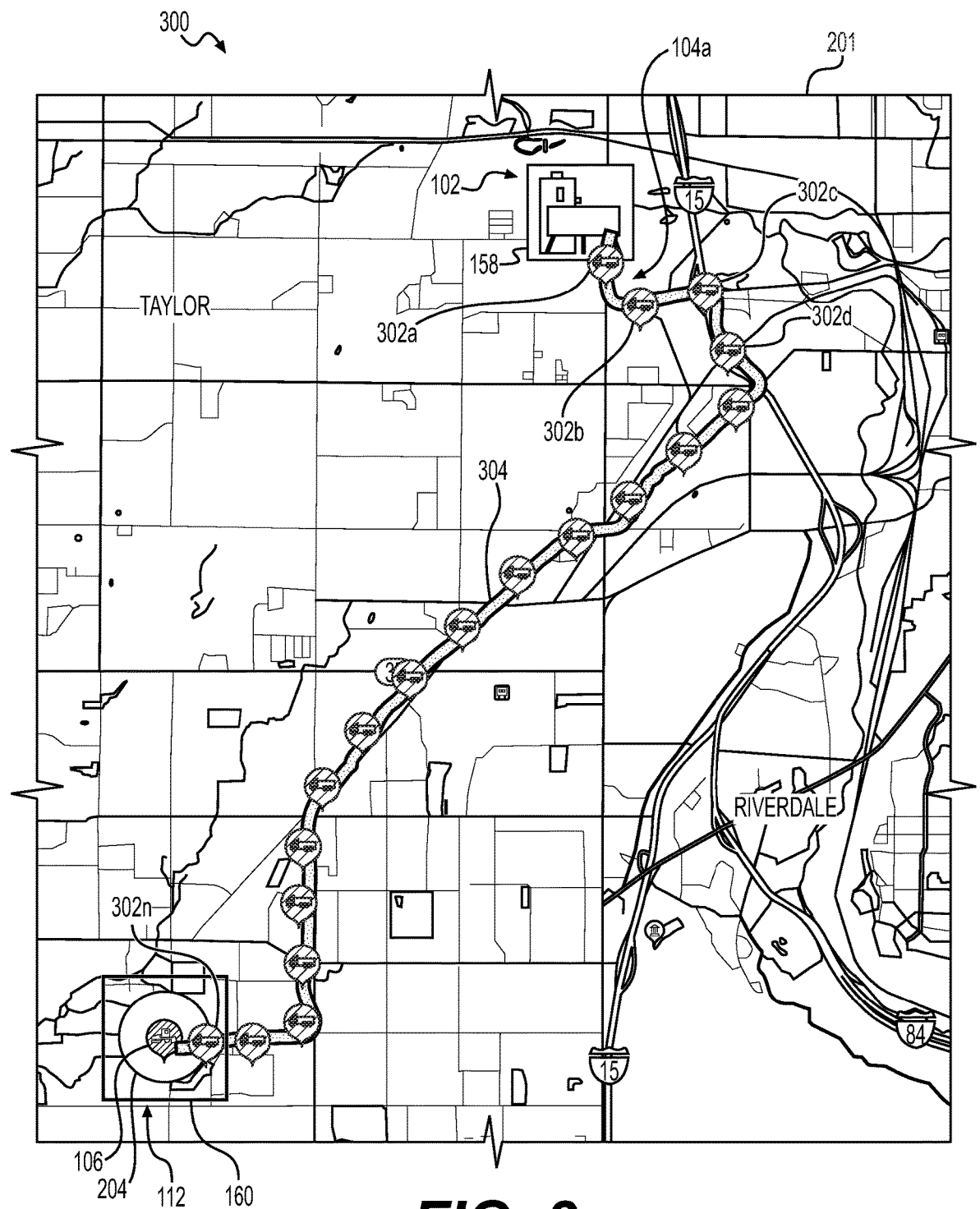
FIG. 3 shows a portion of another example user interface illustrating an example travel path of the present disclosure.
Figure 4:
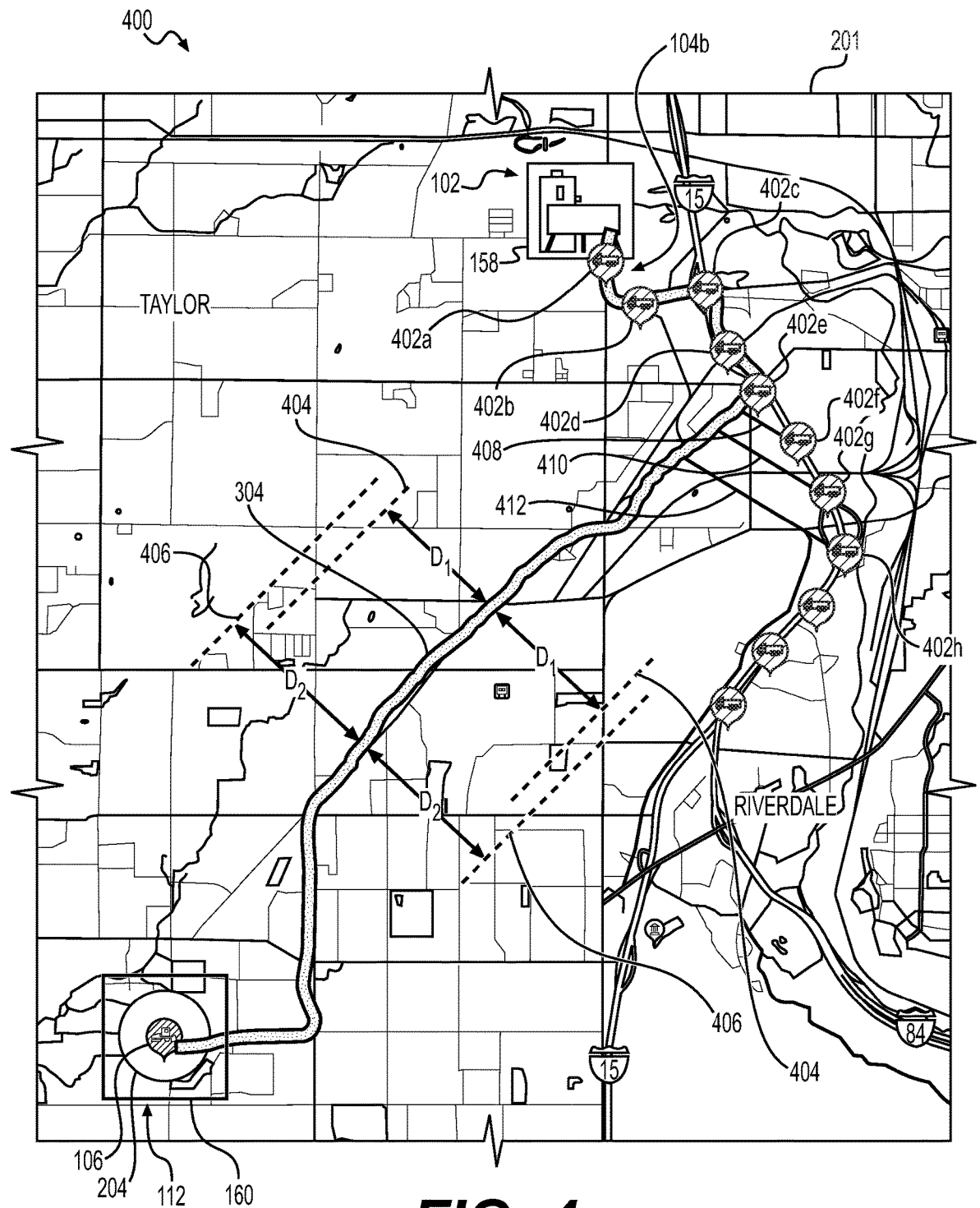
FIG. 4 shows a portion of yet another example user interface illustrating the travel path shown in FIG. 3, and locations of an example haul truck relative to the example travel path.

In examples, such as the examples illustrated in FIGS. 2-4, the user interface 133 includes a map illustrating at least part of a travel path 114. For instance, an example user interface 133 includes one or more lines, highlighted/bolded areas, curves, or other visual indicia representing at least part of the travel path 114, as well as icons, images, or other visual indicia representing the worksite 112, the paving material plant 102, one or more of the paving machines 106, one or more of the haul trucks 104, and/or other components of the paving system 100. An example user interface 133 also includes a map of the area surrounding the worksite 112, surrounding the paving material plant 102, and/or, the geographic area between the paving material plant 102 and the worksite 112. For instance, such a user interface 133 includes lines, icons, markers, road signs, or other visual indicia representing travel paths, roads, haul routes, or other infrastructure along which a haul truck 104 travels between the paving material plant 102 and the worksite 112. In some examples, the visual indicia representing the paving material plant 102, the worksite 112, a paving location within the worksite 112, one or more of the paving machines 106, or various landmarks associated with the geographic area represented on the map correspond to a geofence defining a boundary associated with such items. A geofence is a virtual perimeter for a real-world geographic area, and in some cases, the geofence includes a predefined set of boundaries corresponding to the geographic area. Such boundaries (e.g., the perimeter) of the geofence can be defined using GPS coordinates, UTS coordinates, or by other methods. In the paving system 100, a geofence 158 defines a boundary associated with the paving material plant 102, and a geofence 160 defines a boundary associated with the worksite 112. For example, the geofence 158 overlays, is disposed along, and/or is otherwise associated with at least part of a perimeter of the paving material plant 102. In such examples, the geofence 158 overlays, is disposed along, and/or is otherwise associated with an entrance and/or an exit of the paving material plant 102. Similarly, the geofence 160 overlays, is disposed along, and/or is otherwise associated with at least part of a perimeter of the worksite 112. In such examples, the geofence 160 overlays, is disposed along, and/or is otherwise associated with an entrance and/or an exit of the worksite 112.

In examples of the present disclosure, a location sensor 130 associated with a haul truck 104*a* provides location information to the system controller 122 indicating that the haul truck 104*a* entered or exited the geofence 160 associated with at least part of the perimeter of the worksite 112. For instance, the location sensor 130 sends location information indicating consecutive locations of the haul truck 104*a* along a travel path 114. A first portion of the consecutive locations may be outside of the geofence 160, and a second portion of the consecutive locations may be inside of the geofence 160, and each item of location information sent by the location sensor 130 may include a respective timestamp. In such examples, the system controller 122 determines that the haul truck 104*a* reached the worksite 112 by determining that the one or more items of the consecutive location information indicates a location of the haul truck 104*a* within the geofence 160. The system controller 122 may make analogous determinations with respect to the haul truck 104*a* entering or exiting any of the geofences described herein. Based on such determinations, the travel path system 131 generates and provides an instruction to the electronic device 128 to update a location of a visual indicia corresponding to the haul truck 104*a* on a map displayed in the user interface 133 to match the current location of the haul truck 104*a* indicated by the location information. In some examples, the instruction generated by the travel path system 131 also causes the electronic device 128 to change a characteristic of the visual indicia to indicate the current location of the haul truck 104*a* (e.g., to change a color, shading, shape, size, or appearance of the visual indicia to indicate that the haul truck 104*a* entered the geofence 160 or has otherwise reached the worksite 112).

In some cases, the user interface 133 includes information associated with a respective one of the haul trucks 104, paving material information, and/or other information typically included in a paving ticket generated at the paving material plant 102. Further, it is understood that such user interfaces 133 are displayed via a display of one or more of the haul trucks 104, the electronic device 128, and/or via any other displays associated with the system controller 122, the paving material plant controller 142, or other components of the control system 120. For example, the user interface 133 displays different ones of the haul trucks 104 associated with different projects or worksites 112 and traveling along one or more of the travel paths 114 described herein.

FIG. 2 is an illustration of an example user interface 200 generated by the travel path system 131 shown in FIG. 1, and/or by one or more of the electronic devices 128, the paving material plant controller 142, the truck controller 152, or other controllers of the present disclosure. The example user interface 200 comprises any of the user interfaces 133 described above with respect to FIG. 1, and the user interface 200 of FIG. 2 is configured for display on an LCD display, a CRT display, a touch-screen (e.g., a capacitive/touch-sensitive) display device, and/or any other display 201 operably connected to, in communication with, and/or otherwise associated with one or more of the electronic devices 128, the system controller 122, the paving material plant controller 142, the truck controller 152, or other controllers of the present disclosure. In some examples, such an example display 201 comprises a display of the electronic device 128, a display associated with the system controller 122, a display associated with the paving material plant controller 142, the display 156 associated with the haul truck 104*a* and/or the truck controller 152, and/or a display associated with one or more other components of the control system 120. In further examples, the display 201 comprises the display 156 of one or more of the haul trucks 104 as described above with respect to FIG. 1.

As shown in FIG. 2, an example user interface 200 includes one or more images icons, graphical depictions, symbols and/or other visual indicia that correspond to or otherwise represent one or more travel paths 202 of the present disclosure. For example, as noted above, the travel path system 131 and/or other components of the system controller 122 provide a travel path 202 (e.g., a first or suggested travel path) to one or more electronic devices associated with the haul truck 104*a*. Such electronic devices include an electronic device 128 of an operator associated with the haul truck 104*a*, and the operator can control the haul truck 104*a* to traverse one or more such travel paths from, for example, the paving material plant 102 to the worksite 112. Additionally or alternatively, such electronic devices include the truck controller 152 of the haul truck 104*a*.

In any of the examples described herein, the system controller 122 may obtain the travel path 202 from a third-party source such as an external travel path generation engine. For example, the system controller 122 is configured to receive project information indicating a project identifier uniquely identifying a particular project as well as one or more haul trucks 104 associated with the project identifier (e.g., associated with and/or otherwise assigned to the project). Such project information includes, among other things, GPS coordinates, UTS coordinates, address information, and/or other information indicating a boundary, perimeter, and/or other location of the worksite 112. Such project information also includes, among other things, GPS coordinates, UTS coordinates, address information, and/or other information indicating a boundary, perimeter, and/or other location of the paving material plant 102. In such examples, the system controller 122 accesses an external travel path generation engine such as, for example, via the network 124. Such an external travel path generation engine can include one or more applications, such as Google® maps, Waze®, Apple® maps, or other navigation applications. In such examples, the system controller 122 provides the location information indicating the location of the paving material plant 102 and the location of the worksite 112 to the external travel path generation engine. The external travel path generation engine generates the travel path 202 based at least in part on such information and provides the travel path 202 to the system controller 122 based at least in part on such information. In still further examples, the travel path 202 may comprise a first or previous travel path (e.g., a travel path that was previously traversed by the particular haul truck 104*a* and/or one or more additional haul trucks 104 or mobile machines associated with the unique project identifier) extending from the paving material plant 102 to the worksite 112.

As shown by the visual indicia representing the travel path 202 in FIG. 2, such an example travel path 202 may extend from the paving material plant 102 to the worksite 112. In such examples, the travel path 202 may extend from a first location within the geofence 158 to a second location within the geofence 160. In some examples, such a first location comprises the load station 136, the silo 134, and/or other stations 140 of the paving material plant 102. Similarly, such a second location comprises a location of one or more machines (e.g., a paving machine 106) disposed at the worksite 112. For instance, an example second location comprises and/or is otherwise defined by a geofence 204 surrounding a paving machine 106. In some examples of the present disclosure, the system controller 122 provides the travel path 202 to an electronic device 128 and/or to the truck controller 152 of the haul truck 104a. In such examples, the electronic device 128 and/or the truck controller 152 causes at least part of the travel path 202 to be displayed via the display 201. For instance, the electronic device 128 and/or the truck controller 152 causes at least part of the travel path 202 to be displayed as part of the user interface 200. In such examples, the operator the haul truck 104a utilizes the travel path 202 when traveling from the paving material plant 102 to the worksite 112 in order to reach the worksite 112 in the least amount of time and/or by traveling the shortest possible distance, thereby maximizing efficiency. As will be discussed below with respect to at least FIGS. 3 and 4, the location sensor 130 of the haul truck 104a generates location information indicating locations of the haul truck 104a as the haul truck 104 traverses one or more travel paths of the present disclosure, and the location sensor 130 provides such location information to the system controller 122 via the network 124. Based at least in part on such location information, the system controller 122 determines whether to store one or more such travel paths for future use.

FIG. 3 is an illustration of another example user interface 300 generated by the travel path system 131 shown in FIG. 1, and/or by one or more of the electronic devices 128, the paving material plant controller 142, the truck controller 152, or other controllers of the present disclosure. The example user interface 300 comprises any of the user interfaces 133 described above with respect to FIG. 1, and is configured for display by the display 201 described above. As shown in FIG. 3, the example user interface 300 includes information indicative of machine locations for a particular project and displayed on a map. In some examples, the user interface 300 includes one or more images icons, graphical depictions, symbols and/or other visual indicia that correspond or otherwise represent locations 302a, 302b, 302c, 302d . . . 302n (wherein "n" is any integer greater than zero, and collectively referred to herein as "locations 302") of one or more individual haul trucks 104 (or other machines) associated with a particular project, paving material plant 102, and/or worksite 112. The example user interface 300 also includes one or more images icons, graphical depictions, symbols and/or other visual indicia that correspond to or otherwise represent one or more travel paths 304 of the present disclosure.

For ease of discussion it is understood that the locations 302 shown in the user interface 300 correspond to respective locations of a particular haul truck 104a as the haul truck 104a traverses the travel path 304 from the paving material plant 102 to the worksite 112. For example, each of the respective locations 302 illustrated in FIG. 3 comprise locations identified by the location sensor 130 of the particular haul truck 104a as the haul truck 104a travels to the worksite 112. However, in additional example embodiments, the user interface 300 includes information representing one or more additional haul trucks 104 of the present disclosure. For example, the user interface 300 can further include one or more images icons, graphical depictions, symbols and/or other visual indicia (not shown) that correspond or otherwise represent locations 302 of one or more additional haul trucks 104 (or other machines) associated with the project, paving material plant 102, and/or worksite 112 with which the haul truck 104a is associated. In such examples, the visual indicia of the various haul trucks 104 shown in the user interface 300 share one or more colors, shapes, shadings, and/or other visual characteristics to indicate that such haul trucks 104 are associated with a common project, paving material plant 102, and/or worksite 112. In still further examples, the user interface 300 can include one or more images icons, graphical depictions, symbols and/or other visual indicia (not shown) that correspond or otherwise represent locations 302 of one or more additional haul trucks 104 (or other machines) associated with a different project, paving material plant 102, and/or worksite 112. In such examples, the visual indicia of the various haul trucks 104 shown in the user interface 300 have different shared colors, shapes, shadings, and/or other visual characteristics to indicate that the respective haul trucks 104 or other machines are associated with different respective projects, paving material plants, and/or worksites. In this way, a foreman or other personnel is able to quickly determine a number and location of machines that are associated with respective projects, paving material plants, and/or worksites, and the foreman or other personnel can use this information to, for example, assign more machines to a project to increase project efficiency.

In some examples the system controller 122 (FIG. 1) obtains and/or otherwise receives a first or suggested travel path 202 (FIG. 2) generated by an external travel path generation engine based on location information indicating the location of the paving material plant 102 and the location of the worksite 112. In further examples, the system controller 122 (FIG. 1) obtains and/or otherwise receives a first or previous travel path 202 (FIG. 2) that was previously traversed by one or more of the haul trucks 104 and extending from the paving material plant 102 to the worksite 112. In either such example, the system controller 122 provides such a first travel path 202 to an electronic device 128 associated with a particular haul truck 104a and/or to the truck controller 152 of the haul truck 104. In such examples, providing the travel path 202 to the electronic device 128 and/or the truck controller 152 causes at least part of the travel path 202 to be displayed via the display 201 described above with respect to FIG. 2. In such examples, the system controller 122 receives location information from the location sensor 130 associated with the haul truck 104a as the haul truck 104a traverses the travel path 202. As illustrated in FIG. 3, the example user interface 300 includes visual indicia indicating each of the respective locations 302 identified by the location information. In examples, the visual indicia of the various locations 302 are depicted on the map of the user interface 300 at respective locations corresponding to GPS, UTS, and/or other location information.

Further, in such examples, the system controller 122 is programmed and/or otherwise configured to calculate, generate, determine, and/or otherwise identify a second or current travel path 304 extending from the paving material plant 102 to the worksite 112, based at least in part on such location information. For instance, the travel path 304 may comprise and/or may be generated based on a series of sequential travel segments or trajectories of the haul truck 104a as determined by the system controller 122 based on corresponding sequential GPS coordinates or other such location information. In such examples, the user interface 300 shown in FIG. 3 includes visual indicia illustrating such an example second or current travel path 304. Additionally, as will be described in greater detail below with respect to at least FIG. 5, in some examples, the system controller 122 determines whether the second or current travel path 304 illustrated in FIG. 3 matches the first travel path 202 described above with respect to FIG. 2. Based at least in part on such a determination, the system controller 122 stores the first travel path 202 or the second travel path 304 in a memory associated with the system controller 122. In such examples, the stored travel path can be used by one or more haul trucks 104 of the present disclosure for future deliveries of paving material 108 to the worksite 112.

FIG. 4 is an illustration of yet another example user interface 400 generated by the travel path system 131 shown in FIG. 1, and/or by one or more of the electronic devices 128, the paving material plant controller 142, the truck controller 152, or other controllers of the present disclosure. The example user interface 400 comprises any of the user interfaces 133 described above with respect to FIG. 1, and is configured to be displayed by the display 201 described above. As shown in FIG. 4, the example user interface 400 includes information indicative of machine locations for a particular project and displayed on a map. In some examples, the user interface 400 includes one or more images icons, graphical depictions, symbols and/or other visual indicia that correspond to or otherwise represent locations 402a, 402b, 402c, 402d, 402e, 402f, 402g, 402h ... 402n (wherein "n" is any integer greater than zero, and collectively referred to herein as "locations 402") of one or more individual haul trucks 104 (or other machines) associated with a particular project, paving material plant 102, and/or worksite 112. The example user interface 400 also includes one or more images icons, graphical depictions, symbols and/or other visual indicia that correspond to or otherwise represent one or more travel paths (e.g., the second or current travel path 304) of the present disclosure.

For ease of discussion it is understood that the locations 402 shown in the user interface 400 correspond to respective locations of a particular haul truck 104b as the haul truck 104b traverses at least part of the second travel path 304 described above. In other examples, the user interface 400 includes visual indicia representing the first travel path 202 (e.g., the suggested or previous travel path) described above with respect to FIG. 2. In such examples, the locations 402 shown in the user interface 400 represent respective locations of the haul truck 104b along and/or relative to the travel path 202. With reference to FIG. 4, the visual indicia that correspond to or otherwise represent locations 402a, 402b, 402c, 402d, 402e of the haul truck 104b each indicate that the haul truck 104b is traversing the travel path 304 as the haul truck 104b travels from the paving material plant 102 to the worksite 112. For instance, the system controller 122 receives location information from the location sensor 130 of the haul truck 104b, and the travel path system 131 determines the locations 402a, 402b, 402c, 402d, 402e based at least in part on such location information. In the example illustrated in FIG. 4, such location information indicates that the haul truck 104b is disposed substantially along the travel path 304 during a first part of its trip. For example, each of the locations 402a, 402b, 402c, 402d, 402e identified by the location information may be less than or equal to an acceptable threshold distance from the travel path 304. In some examples, such an acceptable threshold distance may be relatively small (e.g., 100 yards, 200 yards, 500 yards, etc.) in order to account for inconsequential rerouting of the haul truck 104b as the haul truck 104b travels from the paving material plant 102 to the worksite 112. Such inconsequential rerouting of the haul truck 104b is be necessitated by, for example, refueling, rest breaks, traffic jams, detours, or other issues requiring relatively minor deviations from the travel path 304.

In some examples, however, one or more locations identified by the location information received from the location sensor 130 may be greater than such an acceptable threshold distance from the travel path 304. In such examples, such location information indicates that the operator of the haul truck 104b has decided to at least temporarily traverse a travel path that is different from the travel path 304 provided by the user interface 400. With reference to FIG. 4, the visual indicia that correspond to or otherwise represent locations 402f, 402g, 402h, etc. of the haul truck 104b each indicate that the haul truck 104b is traversing a travel path that deviates from and/or that is otherwise different from the travel path 304 as the haul truck 104b travels from the paving material plant 102 to the worksite 112. As described above, the system controller 122 receives location information from the location sensor 130 of the haul truck 104b, and the travel path system 131 determines the locations 402f, 402g, 402h, etc. based at least in part on such location information. In the example illustrated in FIG. 4, such location information indicates that at the location 402f, the haul truck 104b is located a distance 408 greater than the acceptable threshold distance (described above) from the travel path 304, but less than a first threshold distance $D_1$ from the travel path 304. In FIG. 4, the first threshold distance $D_1$ is illustrated by substantially parallel boundary lines 404 extending on opposite sides of the travel path 304. In some examples, such a first threshold distance $D_1$ may be greater than the acceptable threshold distance described above (e.g., 600 yards, 700 yards, 800 yards, 0.5 miles etc.) and is indicative of relatively significant rerouting of the haul truck 104b as the haul truck 104b travels from the paving material plant 102 to the worksite 112. Such rerouting of the haul truck 104b is caused by, for example, traffic jams, detours, wrong turns/misdirection by the operator, or other issues requiring relatively significant deviations from the travel path 304.

In some examples, based at least in part on receiving location information indicating that the haul truck 104b is located at the example location 402f (e.g., located a distance 408 greater than the acceptable threshold distance from the travel path 304, but less than the first threshold distance $D_1$ from the travel path 304), the system controller 122 continues to receive location information from the location sensor 130 of the haul truck 104b without generating one or more alerts. Alternatively, based at least in part on receiving such location information, the system controller 122 generates an alarm, notification, message, signal, and/or other such alert indicating that the haul truck 104b is disposed at a location (e.g., the example location 402o or at a corresponding distance 408 greater than the acceptable threshold distance from the travel path 304. In such examples, the system controller 122 provides such an alert to one or more of the electronic devices 128 described herein, and/or to the truck controller 152 of the haul truck 104b, via the network 124. The one or more of the electronic devices 128 and/or to the truck controller 152 causes such an alert to be displayed via, for example, the display 201.

With continued reference to FIG. 4, location information received by the system controller 122 from the location sensor 130 indicates that at the location 402g, the haul truck 104b is located a distance 410 greater than the first threshold distance $D_1$ from the travel path 304. In such an example, the location information indicates that at the location 402g, the haul truck 104b is located a distance 410 greater than the first threshold distance $D_1$ from the travel path 304, but less than a second threshold distance $D_2$ from the travel path 304. In some examples, such a second threshold distance $D_2$ may be greater than the first threshold distance $D_1$ described above (e.g., 0.75 miles, 1.0 mile, etc.) and is indicative of even more significant rerouting of the haul truck 104b as the haul truck 104b travels from the paving material plant 102 to the worksite 112. In FIG. 4, the second threshold distance $D_2$ is illustrated by substantially parallel boundary lines 406 extending on opposite sides of the travel path 304. Such rerouting of the haul truck 104b is due to, for example, a relatively substantial navigation error by the operator, severe weather conditions, hazardous or dangerous travel conditions associated with the travel path 304, or other issues requiring substantial deviations from the travel path 304. In some examples, based at least in part on receiving location information indicating that the haul truck 104b is located at the example location 402g or at a corresponding distance 410 greater than the first threshold distance $D_1$ from the travel path 304, the system controller 122 generates an alarm, notification, message, signal, and/or other such alert indicating that the haul truck 104b is disposed at a location (e.g., the example location 402g) or at a corresponding distance 410 greater than the first threshold distance $D_1$ from the travel path 304. As described above, in such examples, the system controller 122 provides such an alert to one or more of the electronic devices 128 described herein, and/or to the truck controller 152 of the haul truck 104b, via the network 124. The one or more of the electronic devices 128 and/or to the truck controller 152 cause such an alert to be displayed via, for example, the display 201.

As shown in the example user interface 400 of FIG. 4, location information received by the system controller 122 from the location sensor 130 also indicates that at the location 402h, the haul truck 104b is located at a distance 412 greater than the second threshold distance $D_2$ from the travel path 304, the second threshold distance $D_2$ being greater than the first threshold distance $D_1$ described above. In some examples, based at least in part on receiving location information indicating that the haul truck 104b is located at the example location 402h or at a distance 412 greater than the second threshold distance $D_2$ from the travel path 304, the system controller 122 generates an alarm, notification, message, signal, and/or other such alert (e.g., a second or additional alert) indicating that the haul truck 104b is disposed at a location (e.g., the example location 402h) or at a distance 412 greater than the second threshold distance $D_2$ from the travel path 304. As described above, in such examples, the system controller 122 provides such an alert to one or more of the electronic devices 128 described herein, and/or to the truck controller 152 of the haul truck 104b, via the network 124. The one or more of the electronic devices 128 and/or to the truck controller 152 causes such an alert to be displayed via, for example, the display 201.

In some examples, the process described above with respect to, for example, receiving location information from the location sensor 130 of the haul truck 104b and determining, with the system controller 122, locations or distances 408, 410, 412 of the haul truck 104b relative to a travel path, and relative to threshold distances (e.g., the acceptable threshold distance, the first threshold distance $D_1$, the second threshold distance $D_2$, etc.) from/corresponding to the travel path, may be used by the system controller 122 to determine whether an example travel path (e.g., the second or current travel path 304) corresponds to, is disposed substantially along, substantially overlaps with, and/or otherwise matches another example travel path (e.g., the first or suggested travel path 202). For example, as described above with respect to FIG. 3, the system controller 122 is programmed or otherwise configured to calculate, generate, determine, and/or otherwise identify the travel path 304 based at least in part on the location information indicating the locations 302. The system controller 122 may compare individual locations along the travel path 304 with corresponding locations along the travel path 202. In particular, the system controller 122 is programmed or otherwise configured to determine whether any locations along the travel path 304 are located greater than an acceptable threshold distance from corresponding locations along the travel path 202. In such examples, the acceptable threshold distance is substantially equal to any of the acceptable threshold distances noted above.

In any of the examples described herein threshold distances (e.g., the acceptable threshold distance, the first threshold distance $D_1$, the second threshold distance $D_2$, etc.) may comprise radii or distances measured in a direction extending substantially perpendicular from a travel path (e.g., from the travel path 202). For example, the first threshold distance $D_1$ and the second threshold distance $D_2$ illustrated in FIG. 4 are shown as respective distances measured in a direction extending substantially perpendicular from the travel path 304. It is understood, however, that in additional examples, the system controller 122 uses one or more distances, thresholds, GPS coordinates, UTS coordinates, and/or other location information as inputs in determining whether a haul truck of the present disclosure is located greater than a desired distance from the travel path 304. For example, in some embodiments the location sensor 130 and/or other components of an example haul truck 104b may establish at least one substantially circular mobile geofence centered on the haul truck 104b and having a radius extending approximately 360 degrees (e.g., circumferentially) from, for example, the location sensor 130. In such examples, a location sensor 130 of the haul truck 104b may establish a first mobile geofence having a first radius that is approximately equal to the first threshold distance $D_1$, and a second mobile geofence concentric with the first mobile geofence. In such examples, the second mobile geofence may have a second radius that is approximately equal to the second threshold distance $D_2$ (e.g., that is larger than the first radius of the first mobile geofence). In such examples, location information indicating the position of the travel path 304 relative to (e.g., outside of, intersecting at one or more locations, at least partly within, extending at least partly between, etc.) one or both of the first and second geofences can be used by the system controller 122 in determining whether the haul truck 104b is located greater than a desired distance from the travel path 304.

The system controller 122 is programmed or otherwise configured to determine that the second or current travel path 304 corresponds to, is disposed substantially along, substantially overlaps with, and/or otherwise matches the first or suggested travel path 202 based at least in part on determining that none of (or less than an acceptable number of) the locations along the travel path 304 are located greater than an acceptable threshold distance (e.g., 100 yards, 200 yards, 500 yards, etc.) from corresponding locations along the travel path 202. Alternatively, the system controller 122 is programmed or otherwise configured to determine that the second or current travel path 304 does not correspond to, is not disposed substantially along, does not substantially overlap with, and/or otherwise does not match the first or suggested travel path 202 based at least in part on determining that at least one of (or greater than an acceptable number of) the locations along the travel path 304 is located greater than such an acceptable threshold distance from corresponding locations along the travel path 202. These and other processes will be further described with respect to FIG. 5.

Figure 5:
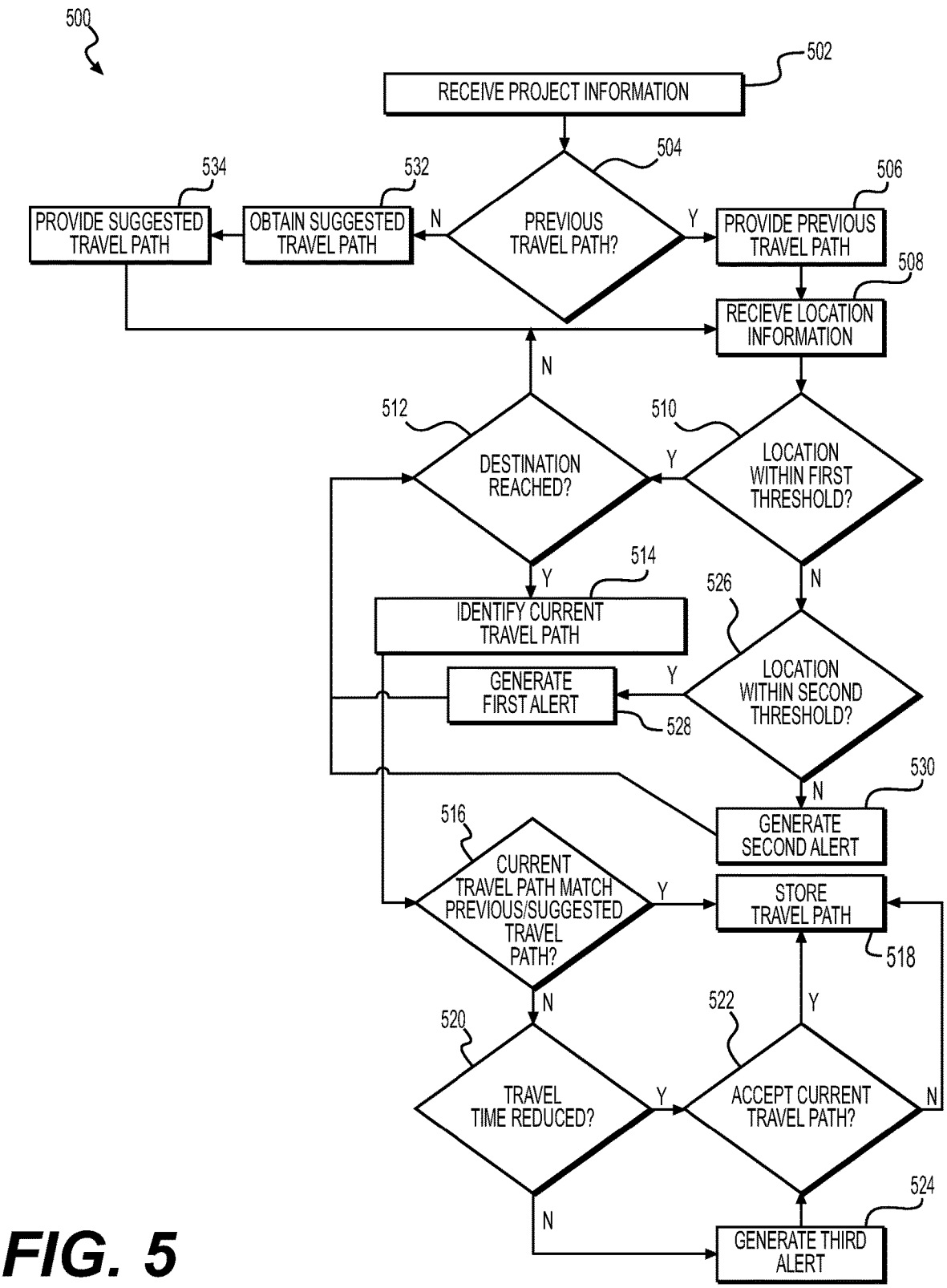
FIG. 5 is a flow chart depicting an example method of identifying a travel path associated with the system shown in FIG. 1.

FIG. 5 illustrates a flow chart depicting an example method 500 of determining locations of machines, such as the haul trucks 104, paving machines 106, compaction machines, and/or other mobile machines described herein, and identifying one or more corresponding travel paths. The example method 500 is illustrated as a collection of steps in a logical flow diagram, which represents operations that may be implemented in hardware, software, or a combination thereof. In the context of software, the steps represent computer-executable instructions stored in memory. When such instructions are executed by, for example, the system controller 122, such instructions may cause the system controller 122, various components of the control system 120, the paving material plant controller 142, the truck controller 152, one or more electronic devices 128 associated with a haul truck 104a or other mobile machine, and/or other components of the paving system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the described methods. For discussion purposes, and unless otherwise specified, the method 500 is described with reference to the paving system 100, the control system 120, the paving material plant 102, the haul trucks 104 (e.g., haul truck 104a and/or haul truck 104b), and/or other items shown in FIGS. 1-4. In particular, although any part of and/or the entire method 500 can be performed by the truck controller 152, the travel path system 131, the paving material plant controller 142, the electronic device 128, and/or other components of the paving system 100, unless otherwise specified the method 500 will be described below with respect to the system controller 122 for ease of description.

With reference to FIG. 5, at 502 the system controller 122 receives project information indicative of one or more paving projects, construction projects, mining projects, and/or other projects associated with the paving material plant 102, and/or with the worksite 112. For example, such project information may be provided to the system controller 122 (e.g., via manual data entry, via electronic transfer using one or more data files, databases, etc.) by one or more foreman, one or more paving material plant employees, one or more worksite employees, and/or one or more operators of the haul trucks 104. Such project information includes the project name, the company or other entity funding the project, a unique project identifier (e.g., an alphanumeric code or other indicia uniquely identifying the particular project), the names, employee numbers, and/or other information of the various haul truck operators assigned to the project, etc. Such project information may also include license plate numbers, alphanumeric codes, and/or other identifiers uniquely identify each of the respective haul trucks 104 associated with the particular project and/or associated with the project identifier. Such project information may further include the address, GPS coordinates, UTS coordinates, and/or other information indicating a location of the paving material plant 102 and/or a location of the worksite 112 remote from the paving material plant 102.

At 504, the system controller 122 determines whether the mobile machine (e.g., the haul truck 104a) has traversed a previous travel path extending from the paving material plant 102 to the worksite 112. As described above with respect to, for example, FIG. 2, such a previous travel path may comprise the travel path 202 associated with the user interface 200. At 504, the system controller 122 determines whether the haul truck 104a has traversed such a previous travel path 202 by, among other things, querying one or more databases or other components of a memory associated with the system controller 122 with reference to locations (e.g., locations 302) along the travel path 202, a starting location of the travel path 202 (e.g., a location of the paving material plant 102), an ending location of the travel path 202 (e.g., a location of the worksite 112), and/or other information associated with the travel path 202.

Based at least in part on determining that the mobile machine (e.g., the haul truck 104a) has traversed a previous travel path extending from the paving material plant 102 to the worksite 112 (504—Yes), at 506, the system controller 122 provides the previous travel path (e.g., the first travel path 202) to the electronic device 128 and/or to the truck controller 152. For example, at 506, the system controller 122 provides information indicative of each location along the travel path 202 to the electronic device 128 and/or to the truck controller 152 via the network 124. At 506, providing the travel path 202 to the electronic device 128 and/or to the truck controller 152 causes at least part of the travel path 202 to be displayed via the display 201, and/or any other display in communication with the electronic device 128 and/or the truck controller 152.

At 508, the system controller 122 receives location information indicating at least one location of the mobile machine (e.g., the haul truck 104a). For example, at 508 the system controller 122 receives location information, via the network 124, from a location sensor 130 disposed on, connected to, carried by, and/or otherwise associated with the haul truck 104a. At 508, such location information may indicate an initial location of the haul truck 104a and/or one or more additional locations of the haul truck 104. For example, such location information may include GPS coordinates, UTS coordinates, and/or other information indicating various locations of the haul truck 104a as the haul truck 104a travels between the paving material plant 102 and the worksite 112. In some examples such location information may indicate an initial location of the haul truck 104a at the paving material plant 102. Such location information may also indicate a final and/or destination location of the haul truck 104a at the worksite 112.

At 510, the system controller 122 determines whether a location of the mobile machine (e.g., a current location of the haul truck 104a) is within a first threshold distance from the travel path 202. For example, at 510 the system controller 122 determines, based at least in part on the location information received at 508, if the current location of the haul truck 104a is less than or equal to a first threshold distance $D_1$ from the travel path 202. Based at least in part on determining that the current location of the haul truck 104a is less than or equal to the first threshold distance $D_1$ from the travel path 202 (510—Yes), at 512, the system controller 122 determines, based at least in part on the location information received at 508, whether a particular destination associated with the project and/or associated with the travel path 202 has been reached. For example, at 512, the system controller 122 determines whether the haul truck 104a (e.g., whether a current location of the haul truck 104a) is located at the worksite 112 and/or at any other final or destination location associated with the travel path 202. Based at least in part on determining that the destination has not been reached (512—No), the system controller 122 continues to receive location information as described above with respect to 508.

On the other hand, based at least in part on determining that the destination has been reached (512—Yes), at 514, the system controller 122 calculates, generates, determines, and/or otherwise identifies, based at least in part on the location information received at 508, a second or current travel path 304 extending from the initial location of the haul truck 104a to the worksite 112, and/or any other destination location associated with the travel path 202. For example, at 514 the system controller 122 determines a series of sequential travel segments and/or trajectories of the haul truck 104a based on corresponding sequential GPS coordinates, UTS coordinates, or other such location information. In such examples, each travel segment and/or trajectory may connect to an adjacent travel segment and/or trajectory that is consecutive thereto. For instance, in such examples, an end point or end coordinates of a first travel segment may comprise a start point or start coordinates of a second travel segment that is consecutive to (e.g., adjacent to) the first travel segment, and so on. The system controller 112 may determine the consecutive and/or sequential nature of the individual travel segments the based at least in part on, for example, timestamp information and/or other metadata associated with the individual items of location information received at 508. In such examples, the second travel path 304 identified at 514 may be a composite travel path comprising each of the sequential travel segments and/or trajectories of the haul truck 104a taken together. In additional examples, at 514, the system controller 122 may calculate, generate, determine, and/or otherwise identify the travel path 304 utilizing other methods.

At 516, the system controller 122 determines whether the second travel path 304 (e.g., the current travel path) identified at 514 matches the first travel path 202 (e.g., the previous or suggested travel path). For example, at 516, the system controller 122 compares individual locations along the travel path 304 with corresponding locations along the first travel path 202. In particular, the system controller 122 may determine whether any locations along the travel path 304 are located greater than an acceptable threshold distance from corresponding locations along the travel path 202. In such examples, the acceptable threshold distance may be substantially equal to any of the acceptable threshold distances noted above (e.g., 100 yards, 200 yards, 500 yards, etc.). Further, at 516, the acceptable threshold distance may comprise a radius or distance measured substantially perpendicularly from the travel path 202 to the travel path 304.

Based at least in part on determining that none of (or less than a threshold number of) the locations along the travel path 304 are located greater than an acceptable threshold distance from corresponding locations along the travel path 202 (516—Yes), the system controller 122 may, at 518, store the travel path 304 in a memory associated with the system controller 122. In some examples, storing the travel path 304 at 518 includes replacing the travel path 202 with the travel path 304 in the memory.

Alternatively, based at least in part on determining that at least one of (or greater than a threshold number of) the locations along the travel path 304 is located greater than such an acceptable threshold distance from corresponding locations along the travel path 202 (516—No), the system controller 122 may, at 520, determine whether traveling from the paving material plant 102 to the worksite 112 via the travel path 304 reduces an expected, previous, and/or known travel time associated with such travel. For example, at 520, the system controller 122 determines a first total travel time $T_1$ associated with traversing the travel path 202. In some examples, the first total travel time $T_1$ may comprise a total elapsed time associated with the haul truck 104a transporting a load of paving material 108 from the paving material plant 102 to the worksite 112 along the travel path 202. In other examples, the first total travel time $T_1$ may comprise a total elapsed time associated with the haul truck 104a returning to the paving material plant 102 from the worksite 112, without a load of paving material 108, along the travel path 202. At 520, the system controller 122 may also determine a second total travel time $T_2$ associated with traversing the travel path 304. In some examples, the second total travel time $T_2$ may comprise a total elapsed time associated with the haul truck 104a transporting a load of paving material 108 from the paving material plant 102 to the worksite 112 along the travel path 304. In other examples, the second total travel time $T_2$ may comprise a total elapsed time associated with the haul truck 104a returning to the paving material plant 102 from the worksite 112, without a load of paving material 108, along the travel path 304. In such examples, the system controller 122 determines the first total travel time $T_1$ and the second total travel time $T_2$ based at least in part on timestamp information and/or other information included in, for example, the location information received at 508.

Based at least in part on determining that second total travel time $T_2$ associated with traversing the travel path 304 is less than the first total travel time $T_1$ associated with traversing the travel path 202 (520—Yes), the system controller 122 stores the travel path 304 in the memory associated with the system controller 122 as described above with respect to 518. For example, based at least in part on determining that second total travel time $T_2$ is less than the first total travel time $T_1$ (520—Yes), the system controller 122 may, at 522, determine whether or not to accept the second or current travel path 304 for future use by the paving system 100. For instance, at 522, the system controller 122 may determine whether a number $N_p$ of machines associated with the project and/or with the project identifier described above that have traversed the second or current travel path 304 is greater than a threshold number $N_t$ of machines. In such examples, the threshold number $N_t$ of machines may comprise two machines, three machines, four machines, five machines, 10 machines, and/or any other number of haul trucks 104, paving machines 106, compaction machines, or other mobile machines. Based at least in part on determining that the number $N_p$ of machines described above is greater than the specified threshold number $N_t$ of machines (522—Yes), the system controller 122 may, at 518, store the second or current travel path 304 in the memory associated with the system controller 122. As noted above, in some examples, storing the travel path 304 at 518 includes replacing the travel path 202 with the travel path 304 in the memory.

Alternatively, based at least in part on determining that the number $N_p$ of machines described above is less than or equal to the specified threshold number $N_t$ of machines (522—No), the system controller 122 may, at 518, store the first or previous travel path 202 in the memory associated with the system controller 122. In some examples, such as examples in which the travel path 202 is already stored in the memory and accepted for future use by the paving system 100, step 518 may be omitted.

Further, based at least in part on determining that second total travel time $T_2$ associated with traversing the travel path 304 is greater than or equal to the first total travel time $T_1$ associated with traversing the travel path 202 (520—No), the system controller 122 may, at 524, generate an alarm, notification, message, signal, and/or other such alert indicating that the travel path 304 identified at 514 may be less than optimal. For instance, such an alert indicates that the travel path 304 results in an increased total travel time $T_2$ relative to the total travel time $T_1$ associated with the travel path 202. Additionally or alternatively, such an alert indicates that traversing the travel path 304 results in increased fuel consumption or is otherwise less efficient as compared to traversing the travel path 202. In such examples, at 524, the system controller 122 provides such an alert to one or more of the electronic devices 128 described herein, and/or to the truck controller 152 of the haul truck 104a, via the network 124. The one or more of the electronic devices 128 and/or to the truck controller 152 may cause such an alert to be displayed via, for example, the display 201. The system controller 122 may proceed from 524 to 522.

With continued reference to FIG. 5, based at least in part on determining that a current location of a particular haul truck (e.g., the location 402g described above with respect to FIG. 4) is located greater than the first threshold distance $D_1$ from the travel path 202 (510—No), at 526, the system controller 122 determines, based at least in part on the location information received at 508, whether the current location of the haul truck (e.g., the location 402g) is located less than a second threshold distance $D_2$ from the travel path 202. In some examples, such a second threshold distance $D_2$ may be greater than the first threshold distance $D_1$ described above.

Based at least in part on determining that the haul truck (e.g., haul truck 104a) is located at an example location greater than the first threshold distance $D_1$ from the travel path 202 and less than the second threshold distance $D_2$ from the travel path 202 (526—Yes), the system controller 122 may, at 528, generate an alarm, notification, message, signal, and/or other such alert indicating that the haul truck 104a is disposed at such a location greater than the first threshold distance $D_1$ from the travel path 202. In such examples, at 528 the system controller 122 provides such an alert to one or more of the electronic devices 128 described herein, and/or to the truck controller 152 of the haul truck 104b, via the network 124. The one or more of the electronic devices 128 and/or to the truck controller 152 causes such an alert to be displayed via, for example, the display 201. The system controller 122 may proceed from 528 to 512.

On the other hand, based at least in part on determining that the haul truck (e.g., haul truck 104a) is located at an example location greater than the second threshold distance $D_2$ from the travel path 202 (526—No), the system controller 122 may, at 530, generate an alarm, notification, message, signal, and/or other such alert indicating that the haul truck 104a is disposed at such a location greater than the second threshold distance $D_2$ from the travel path 202. In such examples, at 530 the system controller 122 provides such an alert to one or more of the electronic devices 128 described herein, and/or to the truck controller 152 of the haul truck 104b, via the network 124. The one or more of the electronic devices 128 and/or to the truck controller 152 causes such an alert to be displayed via, for example, the display 201. The system controller 122 may proceed from 530 to 512.

With continued reference to FIG. 5, based at least in part on determining that the mobile machine (e.g., the haul truck 104a) and/or other haul trucks 104 of the paving system 100 have not traversed a previous travel path extending from the paving material plant 102 to the worksite 112 (504—No), at 532, the system controller 122 obtains a travel path 202 from a third-party source such as an external travel path generation engine. In such examples, at 532 the system controller 122 accesses an external travel path generation engine such as, for example, via the network 124. Such an external travel path generation engine can include one or more applications, such as Google® maps, Waze®, Apple® maps, or other navigation applications. In such examples, the system controller 122 provides the location information indicating the location of the paving material plant 102 and the location of the worksite 112 to the external travel path generation engine. The external travel path generation engine generates the travel path 202 based at least in part on such information and provides the travel path 202 to the system controller 122 based at least in part on such information.

At 534, the system controller 122 provides the suggested travel path (e.g., the first travel path 202) to the electronic device 128 and/or to the truck controller 152. For example, at 534, the system controller 122 provides information indicative of each location along the suggested travel path 202 to the electronic device 128 and/or to the truck controller 152 via the network 124. At 534, providing the travel path 202 to the electronic device 128 and/or to the truck controller 152 causes at least part of the travel path 202 to be displayed via the display 201, and/or any other display in communication with the electronic device 128 and/or the truck controller 152.

In still other examples, the external travel path generation engines described with respect to 532 may not be accessible by the system controller 122 or otherwise available at 532. In such examples, and although not explicitly indicated in FIG. 5, at 532 the system controller 122 may proceed to 508 without providing a suggested or previous travel path 202. Additionally or alternatively, in such examples, at 532 the system controller 122 may temporarily pause until the system controller 122 is able to obtain, access, and/or provide at least one of a previous travel path 202 or a suggested travel path as described herein.

INDUSTRIAL APPLICABILITY

The present disclosure describes systems and methods for tracking machine locations. For example, the present disclosure describes a paving system 100 that includes at least one haul truck 104a configured to haul paving material 108 from a paving material plant 102 to a worksite 112 disposed remote from the paving material plant. The paving system 100 also includes a system controller 122 that is in communication with an electronic device 128 and/or a truck controller 152 of the haul truck 104a. As explained herein, the system controller 122 provides a first travel path 202 to the electronic device 128 and/or the truck controller 152 via a network 124. The system controller 122 also receives location information from one or more location sensors 130 disposed on, carried by, and/or otherwise associated with the haul truck 104a. Such location information indicates one or more locations of the haul truck 104a as the haul truck 104a travels from the paving material plant 102 to the worksite 112. Based at least in part on the location information, the system controller 122 also identifies a second travel path 304 extending from the paving material plant 102 to the worksite 112, and determines whether the second travel path 304 matches the first travel path 202. The system controller 122 also stores at least one of the first travel path 202 and the second travel path 304 in a memory associated with the system controller 122 for future use by components of the paving system 100.

As described above, providing one or more of the travel paths 202, 304 to the electronic device 128 and/or the truck controller 152 may include providing instructions which when executed by the electronic device 128 and/or the truck controller 152 cause the electronic device 128 and/or the truck controller 152 to display at least part of one or both of the travel paths 202, 304 on a display 201 of the present disclosure. Accordingly, the system controller 122 may work in concert with the electronic device 128 and/or the truck controller 152 to display at least part of one or both of the travel paths 202, 304. Further, the iterative process of evaluating the efficiency (e.g., the total travel time and/or the number of additional haul trucks 104 traversing) of travel path 304 relative to the travel path 202, as described herein, may result in an optimized travel path being provided to operators of the haul truck 104 for each project.

Identifying such an optimized travel path and displaying the optimized travel path, in the manner described above, assist the operator of the haul truck 104a in reducing the total travel time required to deliver paving material 108 to the worksite 112. Such a reduction in total travel time increases the overall efficiency of the paving process, and reduces the amount of fuel and/or other resources required to deliver the paving material 108, thereby reducing costs. Such a reduction in total travel time also ensures that the paving material 108 delivered to the worksite 112 is maintained within a desired temperature range. Thus, reducing the total travel time required to deliver paving material 108 or assisting in facilitating a consistent total travel time across multiple haul trucks 104 of the paving system 100 assists in avoiding paving machine stoppages and thereby improves the quality of the paving material mat formed by the paving machine 106.

While aspects of the present disclosure have been particularly shown and described with reference to the embodiments above, it will be understood by those skilled in the art that various additional embodiments are contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
   receiving, with a controller, project information indicating a unique project identifier identifying a project of a plurality of projects, a plurality of mobile machines associated with the project identifier and assigned to the project, and a location of a worksite corresponding to the project;
   providing, with the controller, a first travel path to an electronic device carried by a mobile machine of the plurality of mobile machines, wherein providing the first travel path to the electronic device causes a user interface illustrating at least part of the first travel path to be displayed via a display in communication with the electronic device and carried by the mobile machine, the user interface further illustrating icons indicating real time locations of respective machines of the plurality of mobile machines, including the machine, the icons sharing a common visual indicia indicative of the project identifier, and
      the icons including a first icon representing the machine;
   receiving, with the controller, location information indicating an initial location of the machine and one or more additional locations of the machine, the machine being loaded with paving material, having a first temperature, at the initial location;
   determining, with the controller and based at least in part on the location information, that the machine entered a geofence corresponding to a paving machine disposed at the worksite, the machine transferring the paving material, at a second temperature, to the paving machine at the worksite, the second temperature being within a temperature range associated with the project;
   causing, with the controller and based on determining that the machine entered the geofence, a change in a characteristic of the common visual indicia associated with the first icon as illustrated in the user interface;
   identifying, with the controller and based at least in part on the location information, a second travel path comprising an actual travel path of the machine extending from the initial location to the worksite;
   determining, with the controller, whether the second travel path matches the first travel path; and
   storing the first travel path or the second travel path in a memory associated with the controller, the controller storing the second travel path in the memory if the controller determines that both:
      a location along the second travel path is greater than a threshold distance from the first travel path, and
      a total travel time of the machine traversing the second travel path is less than a total travel time associated with the machine traversing the first travel path.

2. The method of claim 1, wherein the electronic device comprises an electronic device of an operator associated with the machine, the operator controlling the machine to traverse the second travel path from the initial location to the worksite.

3. The method of claim 1, wherein the initial location comprises a paving material plant indicated by the project information as being associated with the project, the paving material plant being located remote from the worksite and operable to load paving material associated with the project into the machine.

4. The method of claim 1, wherein the geofence comprises a first geofence defining a boundary associated with the paving machine, the first geofence being disposed within a second geofence defining at least part of a perimeter of the worksite.

5. The method of claim 1, wherein the project information indicates a location of a paving material plant, the method further comprising:
   determining, with the controller, that the machine has not traversed a previous travel path extending from the paving material plant to the worksite;
   based on determining that the machine has not traversed the previous travel path, providing, with the controller and via a network connection, the location of the paving material plant and the location of the worksite to an external travel path generator; and
   receiving, with the controller, via the network connection, and based on the location of the paving material plant and the location of the worksite, the first travel path from the travel path generator.

6. The method of claim 1, wherein the project information indicates a location of a paving material plant, the method further comprising:
   determining, with the controller, that at least one machine associated with the project identifier traversed a previous travel path extending from the paving material plant to the worksite, wherein the first travel path comprises the previous travel path.

7. The method of claim 1, further comprising:
   determining, with the controller and based at least in part on the location information, that the machine is located greater than a first threshold distance from the first travel path; and generating, with the controller, a first alert based at least in part on determining that the machine is located greater than the first threshold distance from the first travel path.

8. The method of claim 7, further comprising:

determining, with the controller and based at least in part on the location information, that the machine is located greater than a second threshold distance from the first travel path, wherein the second threshold distance is greater than the first threshold distance; and generating, with the controller, a second alert based at least in part on determining that the machine is located greater than the second threshold distance from the first travel path.

9. The method of claim 1, further comprising:

determining, with the controller, that:
- a number of machines associated with the project identifier that have traversed the second travel path is greater than a threshold number of machines, and
- the second travel path is different from the first travel path,
  - wherein storing the first travel path or the second travel path in the memory comprises storing the second travel path in the memory based at least in part on determining that:
    - the number of machines associated with the project identifier that have traversed the second travel path is greater than the threshold number of machines.

10. A system, comprising:

a haul truck configured to haul paving material from a paving material plant associated with a particular project of a plurality of projects to a worksite associated with the project;

a paving machine disposed at the worksite and associated with the particular project; and a controller including one or more processors, the controller being in communication with an electronic device carried by the haul truck via a network, the controller being configured to:

receive project information indicating:
- a unique project identifier identifying the project,
- a plurality of machines, including the haul truck, associated with the project identifier and assigned to the project,
- a location of the paving material plant, and
- a location of the worksite;

provide a first travel path to the electronic device and via the network, the first travel path extending from the paving material plant to the worksite, wherein providing the first travel path to the electronic device causes a user interface illustrating at least part of the first travel path to be displayed via a display in communication with the electronic device and carried by the haul truck,
- the user interface further illustrating real time locations of respective machines of the plurality of machines, including the haul truck,
- the icons sharing a common visual indicia indicative of the project identifier, and
- the icons including a first icon representing the haul truck;

receive location information, the location information indicating one or more locations of the haul truck as the haul truck travels from the paving material plant to the worksite,
- the haul truck being loaded with the paving material, having a first temperature, at the paving material plant;

determine, based on the location information, that the haul truck entered a geofence corresponding to the paving machine, the haul truck transferring the paving material, at a second temperature, to the paving machine, the second temperature being within a temperature range associated with the project;

cause, based on determining that the haul truck entered the geofence, a change in a characteristic of the common visual indicia associated with the first icon as illustrated in the user interface;

identify, based at least in part on the location information, a second travel path comprising an actual travel path of the haul truck extending from the paving material plant to the worksite;

determine whether the second travel path matches the first travel path; and store the first travel path or the second travel path in a memory associated with the controller, the controller storing the second travel path in the memory if the controller determines that both:
- a location along the second travel path is greater than a threshold distance from the first travel path, and
- a total travel time of the haul truck traversing the second travel path is less than a total travel time associated with the haul truck traversing the first travel path.

11. The system of claim 10, wherein the electronic device comprises a controller of the haul truck, the machines of the plurality of machines comprise haul trucks, and the display comprises a display of the haul truck.

12. The system of claim 10, wherein the geofence comprises a first geofence defining a boundary associated with the paving machine, and the first geofence is disposed within a second geofence defining at least part of a perimeter of the worksite, the controller being further configured to:

determine, based at least in part on the location information, that the haul truck entered the second geofence; and identify the second travel path based at least in part on determining that the haul truck entered the second geofence.

13. The system of claim 10, wherein determining whether the second travel path matches the first travel path comprises determining whether respective distances between locations along the second travel path and corresponding locations along the first travel path are less than the threshold distance.

14. The system of claim 10, wherein the controller is further configured to:

determine that a number of haul trucks traveling from the paving material plant to the worksite via the second travel path is greater than a threshold number of haul trucks, wherein storing the first travel path or the second travel path in the memory comprises storing the second travel path in the memory based at least in part on determining that the number of haul trucks traveling from the paving material plant to the worksite via the second travel path is greater than the threshold number of haul trucks, and wherein transferring the paving material to the paving machine at the second temperature prevents stoppage of the paving machine during an operation in which the paving machine deposits the paving material on a work surface of the worksite.

15. A system, comprising:

a controller including one or more processors; and non-transitory computer-readable media storing instructions that, when executed by the one or more processors, cause the one or more processors to perform operations comprising:

providing, via a network, a first travel path to an electronic device carried by a haul truck of a plurality of haul trucks assigned to a particular project, the project having a unique project identifier, and the first travel path extending from a paving material plant associated with the project to a worksite associated with the project, wherein providing the first travel path to the electronic device causes a user interface illustrating at least part of the first travel path to be displayed via a display in communication with the electronic device and carried by the haul truck, the user interface further illustrating icons indicating real time locations of respective haul trucks of the plurality of haul trucks, including the haul truck, the icons sharing a common visual indicia indicative of the project identifier, and the icons including a first icon representing the haul truck;

receiving location information generated using a location sensor carried by the haul truck, the location information indicating one or more locations of the haul truck as the haul truck travels between the paving material plant and the worksite, the haul truck being loaded with paving material, having a first temperature, at the paving material plant;

updating positions of the first icon illustrated in the user interface based at least in part on the location information;

determining, based at least in part on the location information, that the haul truck entered a geofence corresponding to a paving machine disposed at the worksite, the haul truck transferring the paving material, at a second temperature, to the paving machine at the worksite, the second temperature being within a temperature range associated with the project;

causing, based on determining that the haul truck entered the geofence, a change in a characteristic of the common visual indicia associated with the first icon as illustrated in the user interface;

identifying, based at least in part on the one or more locations of the haul truck, a second travel path comprising an actual travel path of the haul truck extending from the paving material plant to the worksite;

determining whether respective distances between locations along the second travel path and corresponding locations along the first travel path are less than a threshold distance; and storing the first travel path or the second travel path in the computer-readable media, the one or more processors storing the second travel path in the computer-readable media if the one or more processors determines that both:

a first location along the second travel path is greater than the threshold distance from a second location along the first travel path, and a total travel time of the haul truck traversing the second travel path is less than a total travel time associated with the haul truck traversing the first travel path.

16. The system of claim 15, wherein the electronic device comprises a controller of the haul truck, and the display comprises a display of the haul truck.

17. The system of claim 15, wherein the operations further comprise:

determining that the haul truck has not traversed a previous travel path extending from the paving material plant to the worksite; and obtaining the first travel path from a travel path source based at least in part on determining that the haul truck has not traversed the previous travel path.

18. The system of claim 15, wherein the threshold distance comprises a first threshold distance, the operations further comprising:

determining, based at least in part on the location information, that the haul truck is located greater than a second threshold distance from the first travel path;

generating an alert based at least in part on determining that the haul truck is located greater than the second threshold distance from the first travel path; and providing the alert to the electronic device via the network.

19. The system of claim 15, wherein the characteristic of the common visual indicia comprises a color, a shading, or a shape, the geofence comprises a first geofence defining a boundary associated with the paving machine, and the first geofence is disposed within a second geofence defining at least part of a perimeter of the worksite.

* * * * *